(12) United States Patent
Sekiguchi et al.

(10) Patent No.: US 9,659,379 B2
(45) Date of Patent: May 23, 2017

(54) INFORMATION PROCESSING SYSTEM AND INFORMATION PROCESSING METHOD

(71) Applicants: Hiroyoshi Sekiguchi, Kanagawa (JP); Terunori Koyama, Kanagawa (JP); Kazuyoshi Yamada, Kanagawa (JP)

(72) Inventors: Hiroyoshi Sekiguchi, Kanagawa (JP); Terunori Koyama, Kanagawa (JP); Kazuyoshi Yamada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 50 days.

(21) Appl. No.: 14/872,518

(22) Filed: Oct. 1, 2015

(65) Prior Publication Data

US 2016/0098841 A1    Apr. 7, 2016

(30) Foreign Application Priority Data

Oct. 3, 2014 (JP) ................................. 2014-204693
Jan. 5, 2015 (JP) ................................. 2015-000389

(51) Int. Cl.
*G06K 9/00* (2006.01)
*G06T 7/00* (2017.01)
(Continued)

(52) U.S. Cl.
CPC ........ *G06T 7/0075* (2013.01); *G01B 11/2513* (2013.01); *G06T 7/529* (2017.01);
(Continued)

(58) Field of Classification Search
CPC . G01B 11/2513; G06T 7/0059; G06T 7/0075; H04N 2013/0081; H04N 13/0022; H04N 13/0239; H04N 5/2256
(Continued)

(56) References Cited

U.S. PATENT DOCUMENTS 7,438,965 B2   10/2008   Ohkura et al.
7,485,357 B2   2/2009    Takada et al.
(Continued)

FOREIGN PATENT DOCUMENTS

JP      4110501          4/2008
JP      2012-141252 A    7/2012
(Continued)

OTHER PUBLICATIONS

Extended European Search Report issued Mar. 2, 2016 in Patent Application 15187756.0.*

(Continued)

*Primary Examiner* — Gregory F Cunningham
(74) *Attorney, Agent, or Firm* — Oblon, McClelland, Maier & Neustadt, L.L.P.

(57) ABSTRACT

An information processing system comprises: a light emitting unit that irradiates pattern light having a specific pattern to a subject to form a texture on the subject; an imaging unit that captures the subject on which the texture is formed; a deriving unit that derives distance information to the subject based on an image captured by the imaging unit; an analyzing unit that analyzes whether or not an image abnormality is present in either one of the captured image and an image based on the distance information; and a dimming unit that performs dimming control when the analyzing unit analyzes that the image abnormality is present.

20 Claims, 23 Drawing Sheets

(51) Int. Cl.
*G01B 11/25* (2006.01)
*H04N 5/225* (2006.01)
*H04N 13/00* (2006.01)
*H04N 13/02* (2006.01)
*G06T 7/529* (2017.01)
*G06T 7/593* (2017.01)

(52) U.S. Cl.
CPC ............ *G06T 7/593* (2017.01); *H04N 5/2256* (2013.01); *H04N 13/0022* (2013.01); *H04N 13/0239* (2013.01); *H04N 2013/0081* (2013.01)

(58) Field of Classification Search
USPC ........................................................ 382/106
See application file for complete search history.

(56) References Cited

U.S. PATENT DOCUMENTS

| | | | |
|---|---|---|---|
| 7,773,478 | B2 | 8/2010 | Hibino et al. |
| 7,848,196 | B2 | 12/2010 | Sekiguchi et al. |
| 7,894,315 | B2 | 2/2011 | Kato et al. |
| 8,000,198 | B2 | 8/2011 | Shinotsuka et al. |
| 8,034,426 | B2 | 10/2011 | Shinkai et al. |
| 8,084,113 | B2 | 12/2011 | Sekiguchi et al. |
| 8,124,211 | B2 | 2/2012 | Sasa et al. |
| 8,124,315 | B2 | 2/2012 | Sekiguchi et al. |
| 8,147,942 | B2 | 4/2012 | Sasa et al. |
| 8,449,965 | B2 | 5/2013 | Sekiguchi et al. |
| 2002/0006282 | A1* | 1/2002 | Ushiro ............... H04N 13/0207 396/429 |
| 2006/0025888 | A1* | 2/2006 | Gutmann ............... G06T 7/0075 700/245 |
| 2006/0088684 | A1 | 4/2006 | Abe et al. |
| 2006/0153053 | A1 | 7/2006 | Deguchi et al. |
| 2006/0209658 | A1 | 9/2006 | Kato et al. |
| 2007/0237064 | A1 | 10/2007 | Fujii et al. |
| 2009/0022932 | A1 | 1/2009 | Fujii et al. |
| 2009/0046550 | A1 | 2/2009 | Kato et al. |
| 2010/0014394 | A1 | 1/2010 | Fujiwara et al. |
| 2010/0079622 | A1 | 4/2010 | Kasahara et al. |
| 2010/0149551 | A1 | 6/2010 | Malinkevich |
| 2010/0231717 | A1 | 9/2010 | Sasaki et al. |
| 2011/0050714 | A1 | 3/2011 | Sekiguchi et al. |
| 2011/0157353 | A1 | 6/2011 | Takayama et al. |
| 2011/0234758 | A1* | 9/2011 | Tsuboi ............... H04N 13/0253 348/46 |
| 2011/0292240 | A1 | 12/2011 | Sekiguchi et al. |
| 2013/0188051 | A1 | 7/2013 | Ishigaki et al. |
| 2014/0132721 | A1* | 5/2014 | Martinez Bauza .... G01B 11/25 348/46 |
| 2014/0132722 | A1 | 5/2014 | Martinez Bauza et al. |
| 2014/0247357 | A1 | 9/2014 | Sekiguchi |
| 2014/0270532 | A1 | 9/2014 | Sawaki et al. |
| 2015/0168135 | A1* | 6/2015 | Kim ..................... G06K 9/6267 348/136 |
| 2015/0243017 | A1 | 8/2015 | Fujimoto et al. |

FOREIGN PATENT DOCUMENTS

| | | |
|---|---|---|
| JP | 2012-181142 | 9/2012 |
| JP | 2013-174547 | 9/2013 |
| JP | 2013-190394 | 9/2013 |
| WO | 2008/026779 A1 | 3/2008 |
| WO | 2013/065868 A1 | 5/2013 |
| WO | 2013/081160 A1 | 6/2013 |

OTHER PUBLICATIONS

U.S. Appl. No. 14/710,787, filed May 13, 2015.
U.S. Appl. No. 14/710,801, filed May 13, 2015.
U.S. Appl. No. 14/714,569, filed May 18, 2015.

* cited by examiner

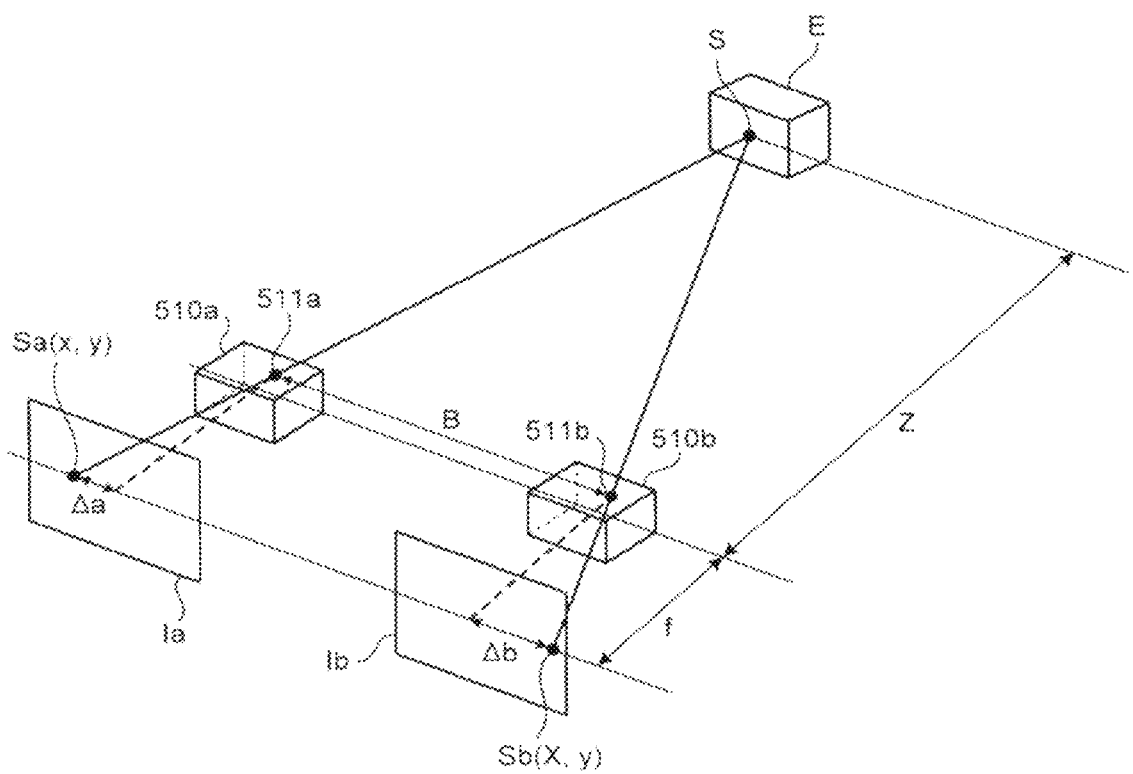

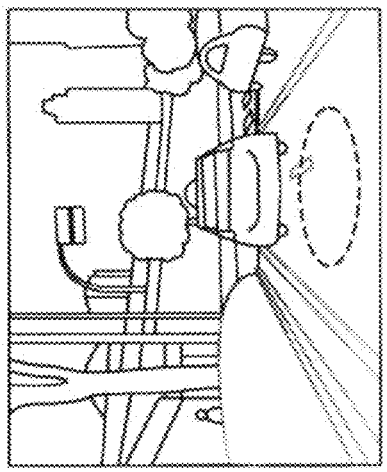
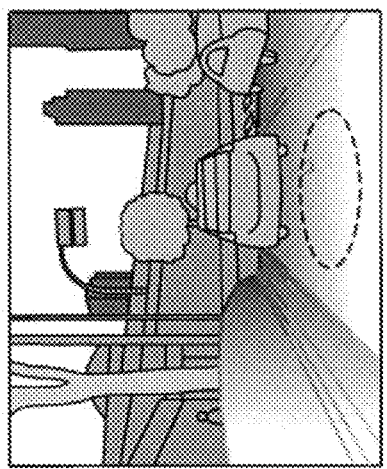
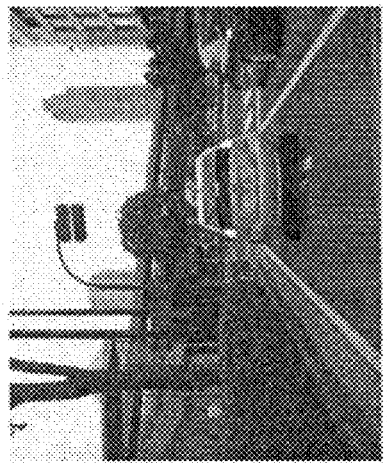

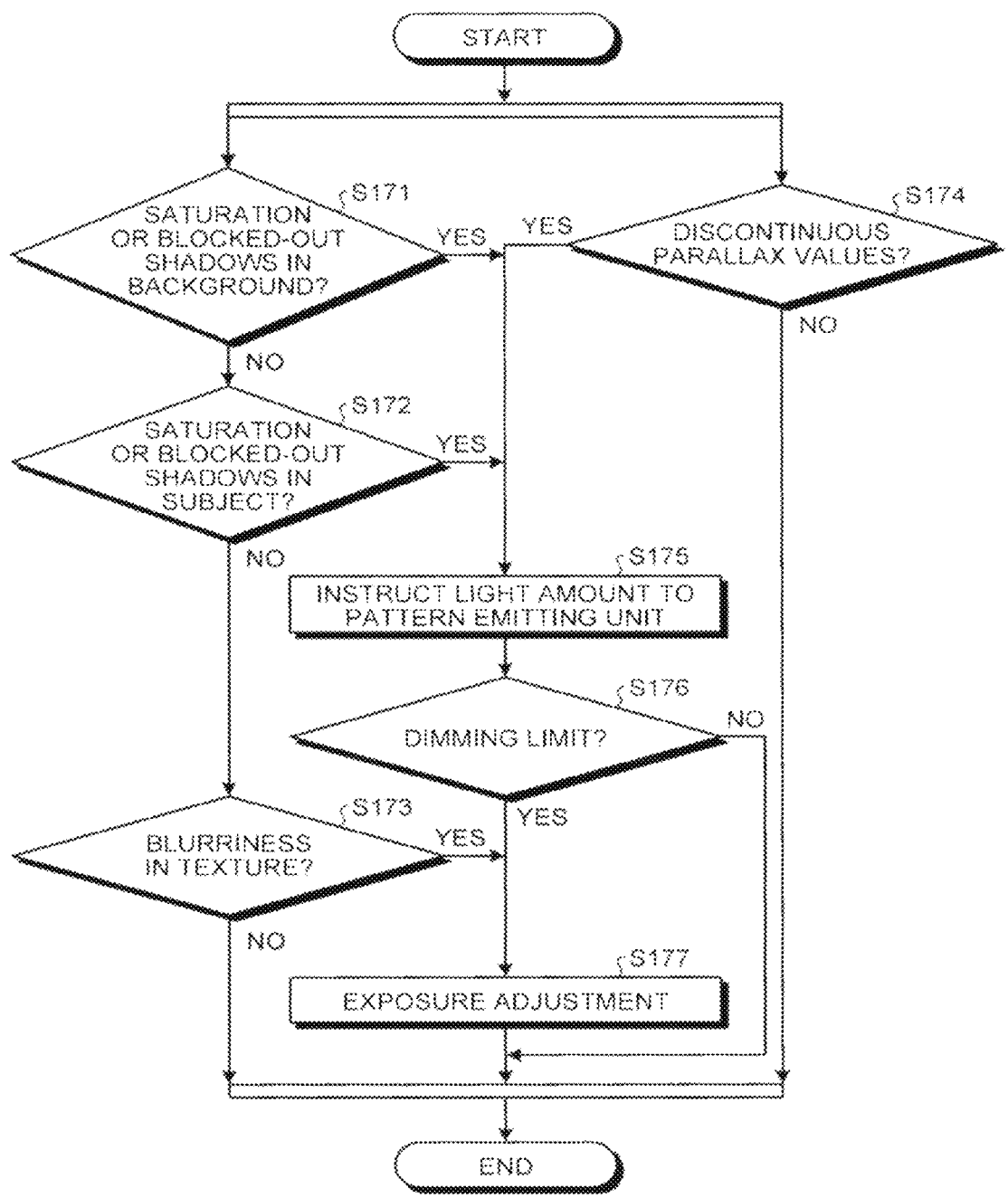

INFORMATION PROCESSING SYSTEM AND INFORMATION PROCESSING METHOD

CROSS-REFERENCE TO RELATED APPLICATIONS

The present application claims priority to and incorporates by reference the entire contents of Japanese Patent Application No. 2014-204693 filed in Japan on Oct. 3, 2014 and Japanese Patent Application No. 2015-000389 filed in Japan on Jan. 5, 2015.

BACKGROUND OF THE INVENTION

1. Field of the Invention

The present invention relates to an information processing system and an information processing method.

2. Description of the Related Art

Recent years, as a technique to measure a distance to an object, a stereo matching process using the triangulation principle with a stereo camera that includes two cameras has been used. The stereo matching process is a process of calculating a distance between a stereo camera and an object included in an image based on a parallax value obtained by matching corresponding regions in a reference image that is captured by one camera and in a comparison image that is captured by the other camera.

However, if a texture is weak in an image in which an object being a subject is captured, when the stereo matching process described above is performed, it is difficult to match corresponding regions appropriately, and it is difficult to derive an accurate parallax value. The texture herein signifies, for example, a figure, a pattern, an arrangement, color, dots, and the like that appear due to respective pixels being dark or light in an image.

Therefore, a technique has been proposed in which a texture is formed by irradiating light having a pattern (hereinafter, pattern light) from a light emitting unit, and the stereo matching process is performed on an image of a subject on which the texture is formed (Japanese Patent Laid-open Publication No. 2012-181142). The pattern of the pattern light herein is a distribution of intensity of light, a distribution of color, or the like to create the texture described above. As described, by performing the stereo matching process on an image on which a texture is formed, the accuracy in deriving a parallax value is improved.

However, in the technique described in the above patent literature, there is a possibility that accuracy in recognizing a subject is affected, for example, when an abnormal condition, such as a state having blocked-out shadows, a saturated state with blown-out highlights, and reflection of light from a light emitting unit, occurs in an image depending on a condition of placement of a subject.

In view of the above problem, there is a need to provide an information processing system and an information processing method in which deterioration of accuracy in recognizing a subject can be suppressed.

SUMMARY OF THE INVENTION

It is an object of the present invention to at least partially solve the problems in the conventional technology.

According to the present invention, there is provided an information processing system, comprising: a light emitting unit that irradiates pattern light having a specific pattern to a subject to form a texture on the subject; an imaging unit that captures the subject on which the texture is formed; a deriving unit that derives distance information to the subject based on an image captured by the imaging unit; an analyzing unit that analyzes whether or not an image abnormality is present in either one of the captured image and an image based on the distance information; and a dimming unit that performs dimming control when the analyzing unit analyzes that the image abnormality is present.

The present invention also provides an information processing system comprising: a light emitting unit that irradiates a pattern light having a specific pattern to a subject to form a texture on the subject; an imaging unit that captures the subject on which the texture is formed; a deriving unit that derives distance information to the subject based on a image captured by the imaging unit; a setting unit that sets information about the subject; and a dimming unit that performs dimming control based on the information about the subject set by the setting unit.

The present invention also provides an information processing method, comprising irradiating pattern light having a specific pattern to a subject to form a texture on the subject; capturing the subject on which the texture is formed; deriving distance information to the subject based on the captured image; analyzing whether or not an image abnormality is present in either one of the captured image and an image based on the distance information; and performing dimming control when analyzed that the image abnormality is present.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a diagram for explaining a principle of calculating a distance from an imaging device to an object;

FIGS. 2A, 2B, and 2C are conceptual diagrams illustrating respectively a reference image, a high-density parallax image, and an edge parallax image;

FIG. 18 is a flowchart of one example of operation of dimming control of the present embodiment;

DETAILED DESCRIPTION OF THE PREFERRED EMBODIMENTS

Figure 3:
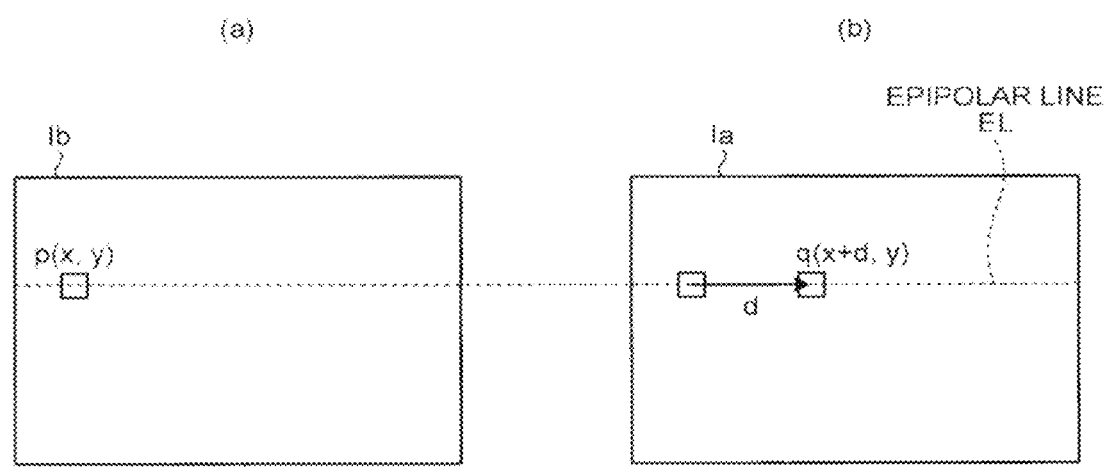
FIG. 3 is an explanatory diagram for a case of calculating a corresponding pixel in the comparison image that corresponds to a reference pixel in the reference image.

Outline of Distance Measuring Method Using SGM Method

Before specific explanation of a present embodiment is described, an outline of a distance measuring method using a semi-global matching (SGM) method is explained using FIGS. 1 to 6.

Principle of Distance Measurement

FIG. 1 is a diagram for explaining a principle of calculating a distance from an imaging device to an object. The principle of measuring a distance from a stereo camera to an object based on a parallax value of the stereo camera with respect to the object is explained with reference to FIG. 1. The parallax value is derived by the stereo matching process.

In the following, for simplicity of explanation, an example of matching in a pixel unit, not matching of a predetermined region including multiple pixels, is explained.

An imaging system shown in FIG. 1 includes an imaging device 510a and an imaging device 510b that are arranged in parallel on the equivalent plane. The imaging devices 510a and 510b have lenses 511a and 511b that refract incident light and form an image on an imaging sensor (not shown) that is a solid-state imaging device, respectively. The images formed by the imaging device 510a and the imaging device 510b are to be a comparison image Ia and a reference image Ib, respectively. In FIG. 1, a point S on an object E in a three-dimensional space is mapped at a position on a straight line parallel to a straight line that connects the lens 511a and the lens 511b in each of the comparison image Ia and the reference image Ib. The point S mapped in each image is a point Sa(x, y) in the comparison image Ia, and a point Sb(X, y) in the reference image Ib. A parallax value dp is expressed as in Equation (1) using the point Sa(x, y) in a coordinate on the comparison image Ia and the point Sb(X, y) in a coordinate on the reference image Ib.

$$Dp = X - x \quad (1)$$

Moreover, the parallax dp can be expressed also as $dp = \Delta a + \Delta b$ when a distance between the point Sa(x, y) in the comparison image Ia and an intersection point on an imaging surface with a normal thereto from the imaging lens 511a is $\Delta a$, and a distance between the point Sb(X, y) in the reference image Ib and an intersection point on an imaging surface with a normal thereto from the imaging lens 511b is $\Delta b$.

Subsequently, by using the parallax dp, a distance Z between the imaging devices 510a, 510b and the object E is derived. The distance Z is a distance from a straight line connecting a focal point of the lens 511a and a focal point of the lens 511b to the point S on the object E. As shown in FIG. 1, the distance Z can be calculated by Equation (2) below by using a focal length f of the imaging lens 511a and the imaging lens 511b, a baseline length B that is a length between the lens 511a and the lens 511b, and the parallax value dp.

$$Z = (B \times f) / dp \quad (2)$$

From this Equation (2), it can be found that the distance Z decreases as the parallax value dp increases, and the distance Z increases as the parallax value dp decreases.

SGM Method

Next, a method of measuring a distance using the SGM method is explained with reference to FIGS. 2 to 6.

FIGS. 2A, 2B, and 2C are conceptual diagrams illustrating respectively a reference image, a high-density parallax image, and an edge parallax image. FIG. 2A illustrates the reference image, FIG. 2B illustrates the high-density parallax image that is acquired by using the reference shown in FIG. 2A, and FIG. 2C illustrates the edge parallax image that is acquired by using the reference image shown in FIG. 2A. The reference image corresponds to the reference image Ib shown in FIG. 1, and is an image in which an imaged subject is expressed by brightness values. Furthermore, the high-density parallax image signifies an image in which respective pixels in the reference image are expressed by parallax values corresponding to respective pixels in the reference image that is derived by the SGM method. The edge parallax image signifies an image in which respective pixels in the reference image are expressed by parallax values corresponding to respective pixels in the reference image that is derived by the block matching method. Parallax values that can be derived by the block matching method are of a part having a relatively strong texture such as an edge portion in the reference image as described later, and when a parallax value cannot be derived as in a part having a weak texture, for example, an image is structured regarding the parallax value as "0".

The SGM method is a method to derive a parallax value appropriately even for a part having a weak texture in an image, and is a method of creating the high-density parallax image shown in FIG. 2B based on the reference image shown in FIG. 2A. The block matching method is a method to derive the edge parallax image shown in FIG. 2C based on the reference image shown in FIG. 2A. According to the SGM method, as can be seen when portions inside ellipses with broken lines in FIG. 2B and FIG. 2C are compared, the high-density parallax image can express a distance based on more detailed parallax value even for a road and the like having a weak texture, compared to the edge parallax image, and therefore, more detailed measurement of distance can be performed.

The SGM method is a method in which a parallax value is not immediately calculated after calculating a cost value as a matching degree of the comparison image with respect to the reference image, but further calculates a combination cost value after calculating the cost value to derive the parallax value. In the SGM method, a parallax image (a high-density parallax image, herein) that is expressed by parallax values corresponding to almost all pixels in the reference image is finally derived.

In the block matching method, while the point in which a cost value is calculated is the same as the SGM method. However, in the block matching method, unlike the SGM method, the combination cost value is not calculated but only a parallax value of a portion having a relatively strong texture, such as an edge portion, is derived.

Calculation of Cost Value

Figure 4:
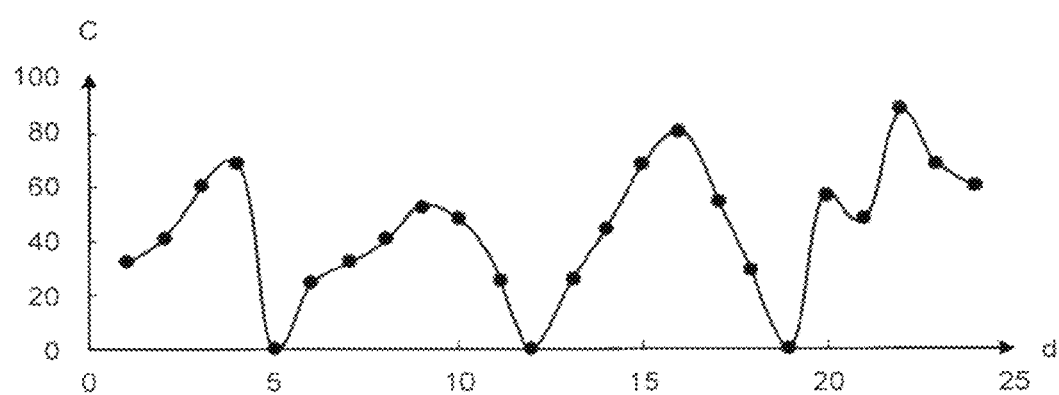
FIG. 4 is a graph illustrating one example of relation between a shift amount and a cost value.

FIG. 3 is an explanatory diagram for a case of calculating a corresponding pixel in the comparison image that corresponds to a reference pixel in the reference image. FIG. 4 is a graph showing one example of relation between a shift amount and a cost value. Referring to FIGS. 3 and 4, a calculation method of a cost value $C(p, d)$ is explained. In the following, explanation is given assuming that $C(p, d)$ indicates $C(x, y, d)$.

In FIG. 3, section (a) is a conceptual diagram illustrating a reference pixel in the reference image, and section (b) is a conceptual diagram when a cost value is calculated while sequentially shifting a candidate of a corresponding pixel in the comparison image corresponding to the reference pixel shown in the section (a). The corresponding pixel signifies a pixel in the comparison image that most resembles to the reference pixel in the reference image. Moreover, the cost value is an evaluation value that expresses a matching degree of each pixel in the comparison image relative to the reference pixel in the reference image. The cost value (and the combination cost value) in the following indicates that the smaller the value, the more a pixel in the comparison image resembles to the reference pixel.

As shown in the section (a) of FIG. 3, based on respective brightness values of a reference pixel $p(x, y)$ in the reference image Ib and of a candidate pixel $q(x+q, y)$ that is a candidate of a corresponding pixel on an epipolar line EL in the comparison image Ia with respect to the reference pixel $p(x, y)$, the cost value $C(p, d)$ of the candidate pixel $q(x+q, y)$ of the corresponding pixel to the reference pixel $p(x, y)$ is calculated. d is a shift amount (displacement amount) between the reference pixel p and the candidate pixel q, and a shift amount d is shifted in a pixel unit. That is, in FIG. 3, sequentially shifting the candidate pixel $q(x+q, y)$ by one pixel amount within a predetermined shift range (for example, 0<d<25), the cost value $C(p, d)$ that is a matching degree in brightness values of the candidate pixel $q(x+q, y)$ and the reference pixel $p(x, y)$ is calculated.

As described above, the imaging devices 510a and 510b are arranged in parallel on the equivalent plane, the comparison image Ia and the reference image Ib also have relation of being parallel on the equivalent plane. Therefore, the corresponding pixel in the comparison image Ia to the reference pixel p in the reference image Ib is to be present on the epipolar line EL that is shown as a line in a horizontal direction on the drawing in FIG. 3, and to acquire a corresponding pixel in the comparison image Ia, it is necessary to search a pixel on the epipolar line EL in the comparison image Ia.

The cost value $C(p, d)$ thus calculated is expressed by the graph shown in FIG. 4 in relation with the shift amount d. In the example shown in FIG. 4, the cost value C is "0" when the shift amount d=5, 12, 19, and therefore, the lowest value cannot be acquired. For example, when there is a portion having a weak texture in an image, it thus becomes difficult to acquire the lowest value of the cost value C.

Calculation of Combination Cost Value

Figure 5:
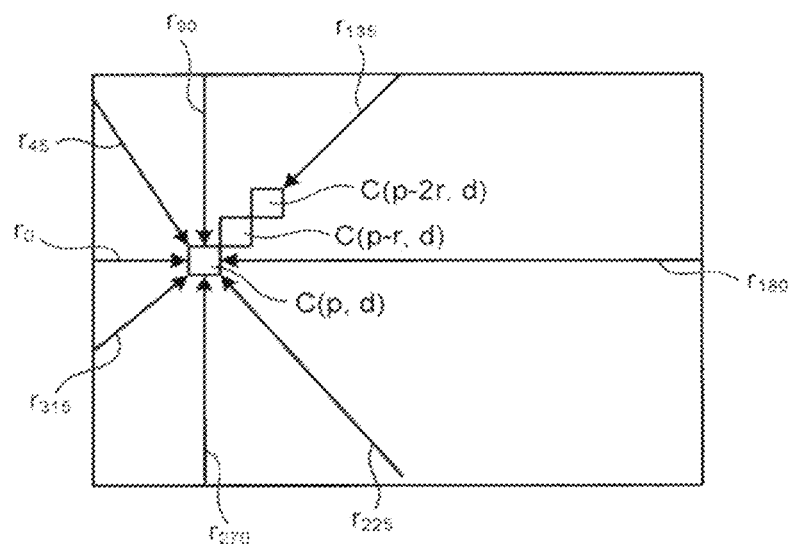
FIG. 5 is a conceptual diagram for calculating a combination cost.
Figure 6:
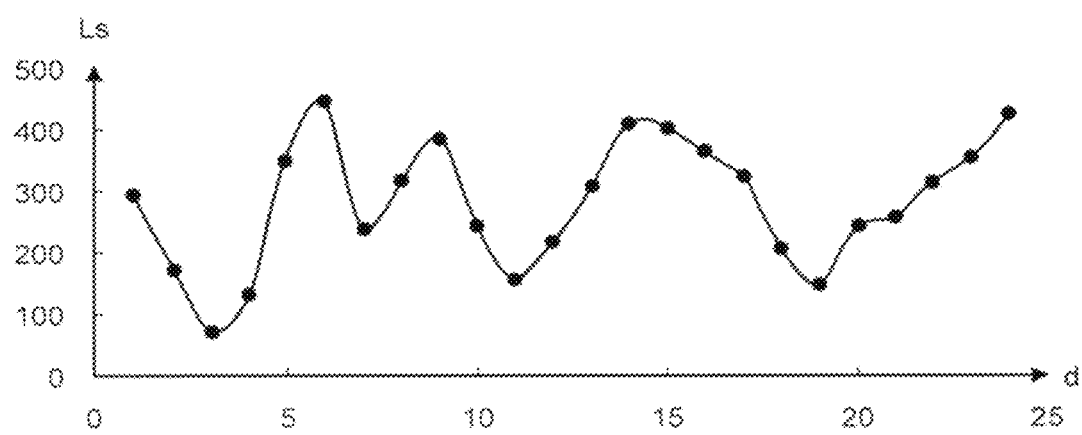
FIG. 6 is a graph illustrating one example of relation between a shift amount and a combination cost value.

FIG. 5 is a conceptual diagram for calculating a combination cost. FIG. 6 is a graph showing one example of relation between a shift amount and a combination cost value. Referring to FIGS. 5 and 6, a calculation method of a combination cost value $Ls(p, d)$ is explained.

In calculation of the combination cost value, not just the cost value $C(p, d)$ is calculated, but cost values when pixels around the reference pixel $p(x, y)$ are regarded as the reference pixel are aggregated to the cost value $C(p, d)$ in the reference pixel $p(x, y)$ to calculate the combination cost value $Ls(p, d)$. To calculate the combination cost value $Ls(p, d)$, a path cost value $Lr(p, d)$ is first calculated. The path cost value $Lr(p, d)$ is calculated by Equation (3) below.

$$Lr(p,d)=C(p,d)+\min(Lr(p-r,k)+P(d,k)) \quad (3)$$

(P=0 (when d=k)
P=P1 (when |d−k|=1)
P=P2 (>P1) (when |d−k|>1)

As indicated in Equation (3), the path cost value Lr is calculated recursively. r indicates a direction vector in an aggregation direction, and has two components of an x direction and a y direction. min( ) is a function to calculate a lowest value. $Lr(p-r, k)$ indicates the path cost value Lr of respective cases when the shift amount is changed (the shift amount in this case is k) for a pixel at coordinates shifted by one pixel from the coordinates of the reference pixel p in an r direction. Based on relation between d, which is the shift amount of the path cost value $Lr(p, d)$, and a shift amount k, a value $P(d, k)$ is acquired as (a) to (c) below, to calculate $Lr(p-r, k)+P(d, k)$.

(a) when d=k, P=0. That is, $Lr(p-r, k)+P(d, k)=Lr(p-r, k)$.
(b) when |d−k|=1, P=P1. That is, $Lr(p-r, k)+P(d, k)=Lr(p-r, k)+P1$.
(c) when |d−k|>1, P=P2 (>P1). That is, $Lr(p-r, k)+P(d, k)=Lr(p-r, k)+P2$.

$\min(Lr(p-r, k)+P(d, k))$ indicates a value obtained by extracting the lowest value from among $Lr(p-r, k)+P(d, k)$ calculated in above (a) to (c) when k is varied to various values. That is, when shifting from a pixel that is shifted by the shift amount k from a pixel (p−r) that is adjacent in the r direction to a pixel positioned at coordinates of the reference pixel p in the comparison image Ia, by adding a value P1 or a value P2 (>P1), the shift amount d is controlled not to be affected too much by the discontinuous path cost value Lr for the pixel apart from the coordinates of the reference pixel p in the comparison image Ia. Furthermore, the value P1 and the value P2 are fixed parameters that are determined in advance by experiments, and are such parameters that the parallax values of adjacent reference pixels on the path are likely to be continuous. As described, to acquire the path cost value Lr at each pixel in the r direction in the comparison image Ia, the path cost value Lr is acquired first from a pixel at the end in the r direction from the coordinates of the reference pixel p(x, y), and the path cost values Lr are acquired along the r direction.

As shown in FIG. 5, the path cost values Lr, namely, $Lr_0$, $Lr_{45}$, $Lr_{90}$, $Lr_{135}$, $Lr_{180}$, $Lr_{225}$, $Lr_{270}$, and $Lr_{315}$, of 8 directions ($r_0$, $r_{45}$, $r_{90}$, $r_{135}$, $r_{180}$, $r_{225}$, $r_{270}$, and $r_{315}$) are acquired, and the combination cost value Ls(p, d) is finally acquired based on Equation (4) below.

$$Ls(p,d)=\Sigma Lr \quad (4)$$

The combination cost value Ls(p, d) calculated as above can be expressed by the graph shown in FIG. 6 in relation with the shift amount d. In the example shown in FIG. 6, the combination cost value Ls takes the lowest value when the shift amount d=3, and therefore, is derived as the parallax value dp=3. Although the number of r direction is 8 in the above explanation, it is not limited thereto. For example, it may be 16 directions by further dividing each of the 8 directions into two, or may be 24 directions by dividing into three, or the like. Alternatively, the combination cost value Ls may be calculated by acquiring the path cost values Lr of either ones out of the 8 directions, and by totalizing the path cost values Lr.

Specific Explanation of the Present Embodiment

The present embodiment is specifically explained with reference to FIGS. 7 to 18. In the present embodiment, an example in which a parallax-value deriving system to derive a parallax value by the stereo matching process described above is installed in a conveying system that has a robot arm is explained. The following explanation of the present embodiment is not to limit the present invention, but following components in the embodiments include ones that a person skilled in the art can easily arrive at, ones substantially identical, and ones in a so-called range of equivalents. Moreover, within a scope not departing from the gist of the embodiment, various kinds of omission, replacement, modification, and combination of the components can be made.

Entire Configuration of Conveying System

Figure 7:
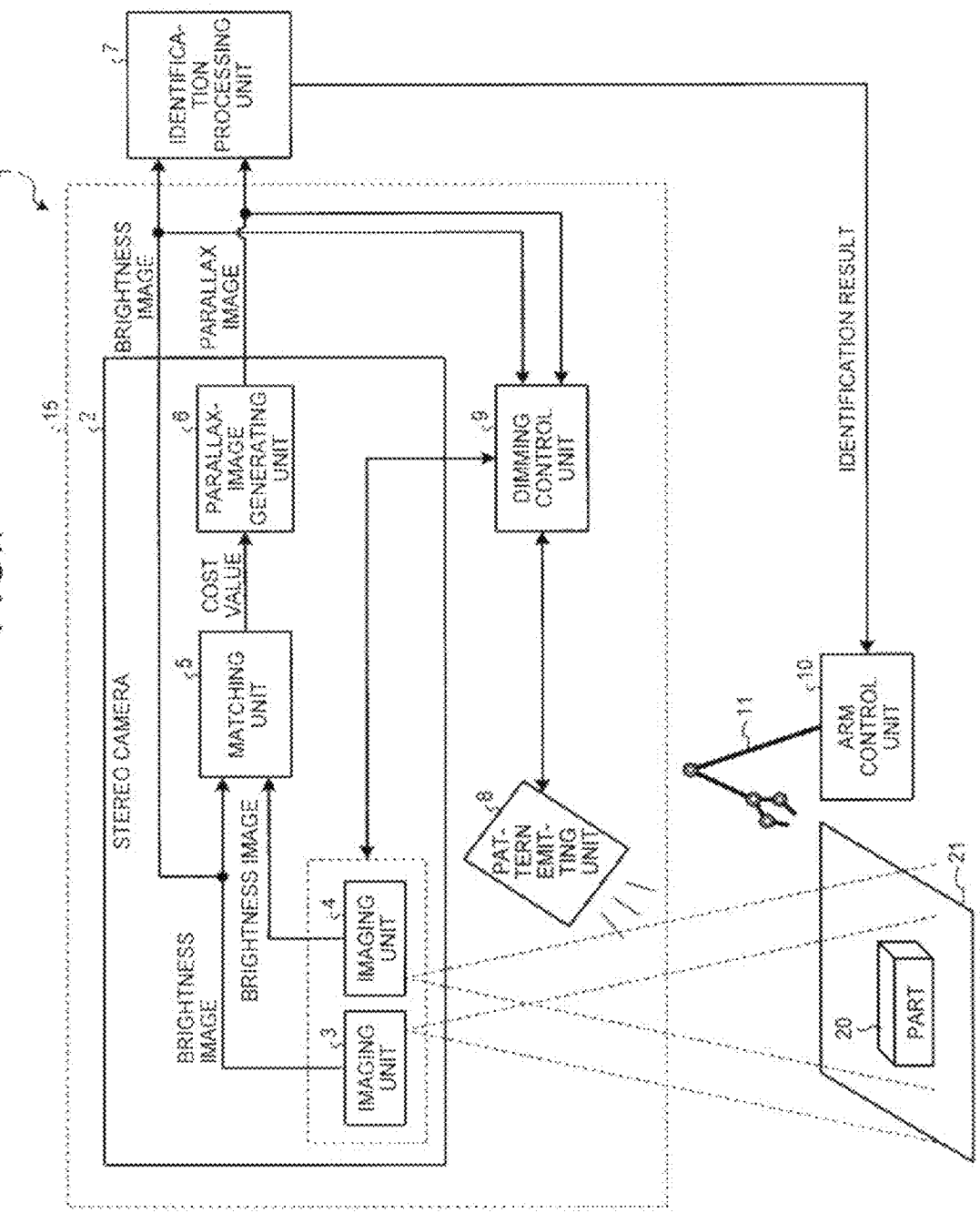
FIG. 7 is a block diagram illustrating one example of an entire configuration of a conveying system of an embodiment of the present invention.

FIG. 7 is a block diagram showing one example of an entire configuration of a conveying system of the present embodiment. Referring to FIG. 7, the entire configuration of a conveying system 1 according to the present embodiment is explained.

As shown in FIG. 7, the conveying system 1 of the present embodiment is a system that holds a part that is placed on a stage (hereinafter, "background portion 21") with a robot arm and conveys to a destination. As shown in FIG. 7, the conveying system 1 includes a parallax-value deriving system 15, which is an example of an information processing system, an identification processing unit 7, an arm control unit 10, and an arm 11.

The parallax-value deriving system 15 is a system that generates a parallax image of a subject from a brightness image that is obtained by imaging the subject by two imaging units in a state in which a pattern light is irradiated to a part being the subject. The parallax-value deriving system 15 includes a stereo camera 2, a pattern emitting unit 8 (light emitting unit), and a dimming control unit 9.

The stereo camera 2 is a device that generates a parallax image of a subject from a brightness image that is obtained by imaging a part being the subject with two imaging units. The stereo camera 2 includes imaging units 3 and 4, a matching unit 5, and a parallax-image generating unit 6. Functions of the imaging units 3 and 4, the matching unit 5, and the parallax-image generating unit 6 are described later with reference to FIG. 11.

The pattern emitting unit 8 is a device that irradiates a pattern light having a special pattern to a part 20 to be a subject captured by the imaging units 3 and 4. As the special pattern, it is preferable to be, for example, a two-dimensional random number pattern, a pattern having multiple lightness values, or the like. On the other hand, a pattern having a repeated cycle is not preferable as the special pattern because the cost value C can be repeated. By thus irradiating the pattern light to the part 20 by the pattern emitting unit 8, a texture can be formed on the part 20. Therefore, the accuracy of a parallax value that is derived by the stereo matching process can be improved.

The dimming control unit 9 is a device that analyzes whether or not there is an abnormality in a brightness image and a parallax image that are output by the stereo camera 2, determines, when determining that there is an abnormality, an adjustment value of a light amount of the pattern light to be irradiated by the pattern emitting unit 8, and transmits the determined adjustment amount to the pattern emitting unit 8. For example, when detecting that a region having blocked-out shadows is included in a brightness image received from the stereo camera 2, the dimming control unit 9 transmits an adjustment amount to increase the light amount of the pattern light to the pattern emitting unit 8, to solve the state having blocked-out shadows. Moreover, when detecting that a region in a saturated state is included in a brightness image received from the stereo camera 2, the dimming control unit 9 transmits an adjustment amount to decrease the light amount of the pattern light to the pattern emitting unit, to solve the saturated state. Although the dimming control unit 9 receives a captured image of the imaging unit 3 as the brightness image to be received, it is not limited thereto, but a captured image of the imaging unit 4 may be received.

Functions of the stereo camera 2, the pattern emitting unit 8, and the dimming control unit 9 of the parallax-value deriving system 15 are described later in detail with reference to FIGS. 8 and 9.

The identification processing unit 7 is a device that identifies a shape, a position, a distance, and the like of the part 20 that is imaged by the stereo camera 2 based on a brightness image and a parallax image output by the stereo camera 2. The arm control unit 10 is a device that performs control to cause the arm 11, which is an articulated robot, or the like, to hold the part 20 to convey to a destination.

Hardware Configuration of Parallax-Value Deriving System

Figure 8:
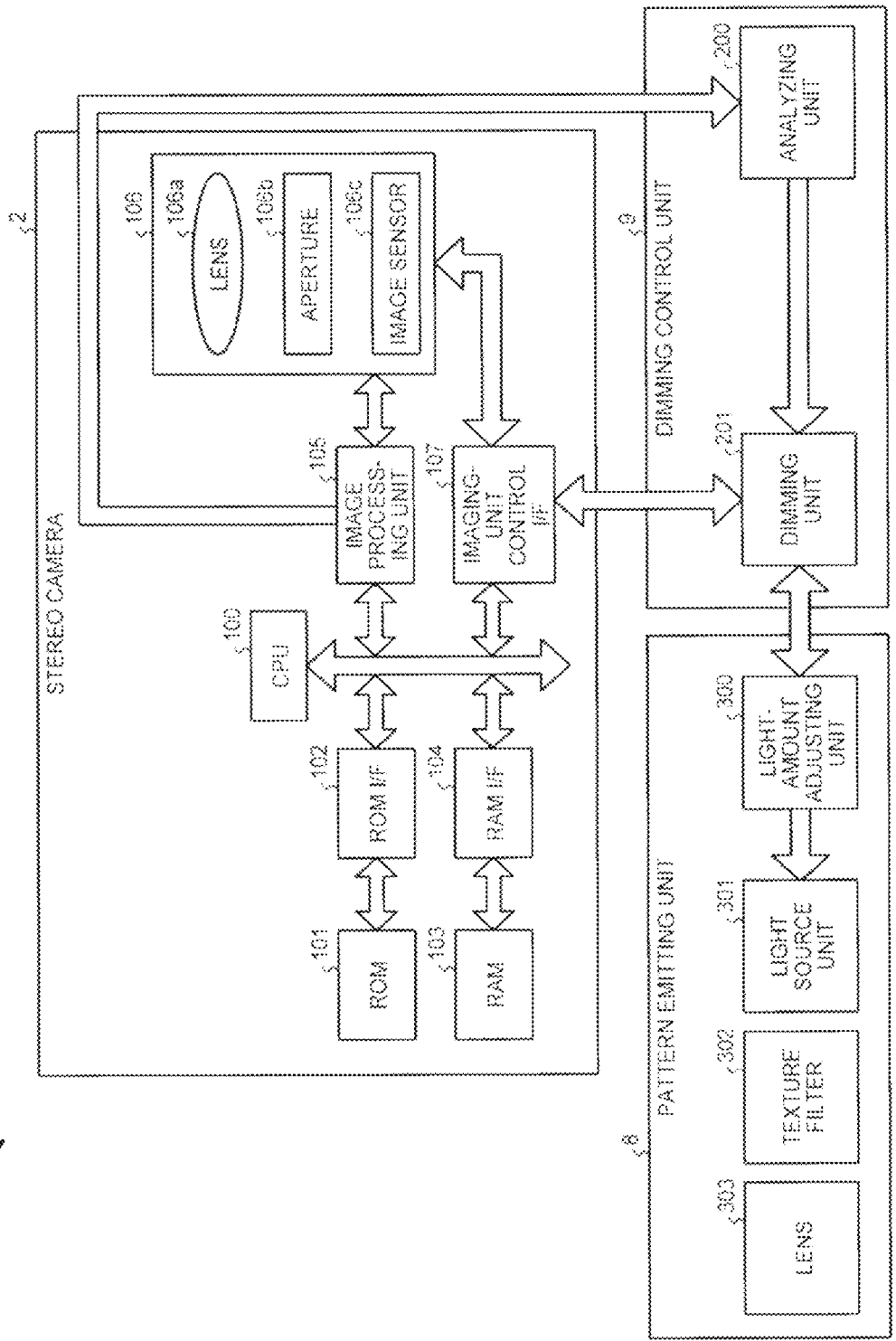
FIG. 8 is a block diagram illustrating one example of a hardware configuration of a parallax-value deriving system according to the present embodiment.
Figure 9:
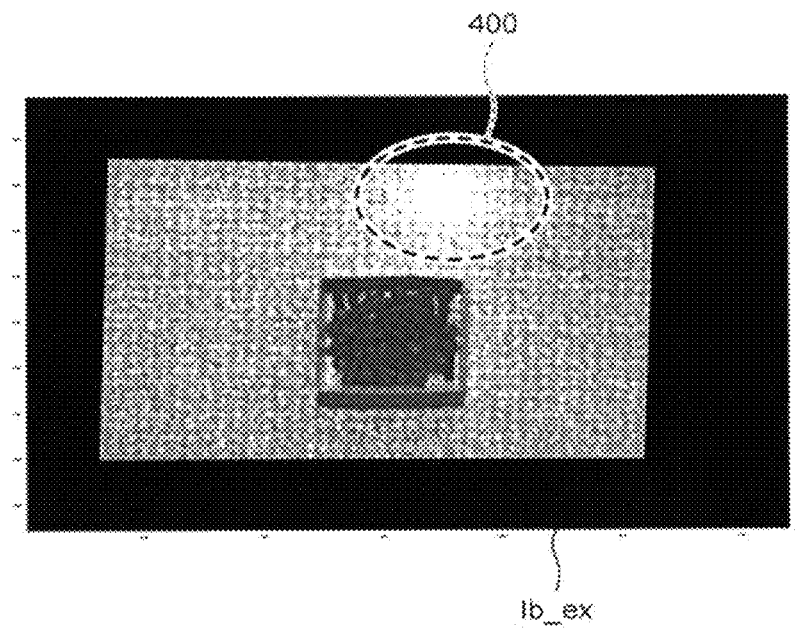
FIG. 9 is a diagram illustrating one example of reflection of pattern light in an image.
Figure 10:
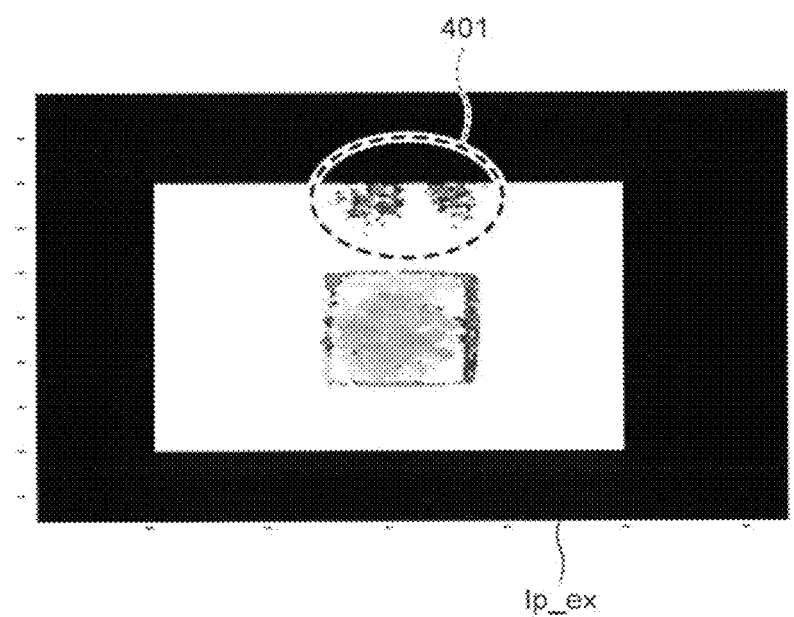
FIG. 10 is a diagram illustrating one example of discontinuity of parallax values generated by reflection.

FIG. 8 is a block diagram illustrating one example of a hardware configuration of the parallax-value deriving system according to the present embodiment. FIG. 9 illustrates one example of reflection of the pattern light in an image. FIG. 10 illustrates one example of discontinuity of parallax values generated by reflection. The hardware configuration of the parallax-value deriving system 15 according to the present embodiment is mainly explained with reference to FIGS. 8 to 10.

As shown in FIG. 8, the stereo camera 2 of the parallax-value deriving system 15 includes a central processing unit (CPU) 100, a read only memory (ROM) 101, a ROM interface (I/F) 102, a random access memory (RAM) 103, a RAM I/F 104, an image processing unit 105, an imaging unit 106 (imaging unit), and an imaging-unit control I/F 107.

The CPU 100 is a computing device that controls various functions of the stereo camera 2. The ROM 101 is a non-volatile storage device that stores a program to be executed for the CPU 100 to control various functions of the stereo camera 2. The ROM I/F 102 is an interface that connects the CPU 100 and the ROM 101 to execute read and write actions to the ROM 101 by a command from the CPU 100.

The RAM 103 is a volatile storage device that functions as a work memory of the CPU 100, and a buffer and the like for a captured image that is input from the image processing unit 105 through the RAM I/F 104. The RAM I/F 104 is an interface that connects the CPU 100 and the RAM 103 to execute read and write actions to the RAM 103 by a command from the CPU 100.

The image processing unit 105 is a hardware circuit, such as a field programmable gate array (FPGA) and an application specific integrated circuit (ASIC), that generates a parallax image from a captured image (brightness image) that is imaged by the imaging unit 106.

The imaging unit 106 is a device that is constituted of two imaging units, although only one is illustrated in FIG. 8 for simplicity's sake, that are fixed by fixing jigs in a state in which the two imaging units are apart from each other by a predetermined distance, and each of which images a subject, and is a device that that generates image data in an analog format, and converts the analog image data into image data of digital format. The imaging unit 106 includes a lens 106*a*, an aperture 106*b*, and an image sensor 106*c*.

The lens 106*a* is an optical device to provide an image of a subject in the image sensor 106*c* by refracting incident light. The aperture 106*b* is a member that adjusts an amount of light by blocking a part of light that has passed through the lens 106*a* and forms an image in the image sensor 106*c*. The image sensor 106*c* is a solid-state imaging device that converts light that has entered into the lens 106*a* and has passed through the aperture 106*b* into an electric image data of analog format. The image sensor 106*c* is fabricateed, for example, by a charge-coupled device (CCD) or a complementary metal-oxide semiconductor (COMS).

The imaging-unit control I/F 107 is an interface that relays a register setting value for controlling an exposure time of the imaging unit 106 from the dimming control unit 9 to the imaging unit 106, or relays, in reverse, a register setting value from the imaging unit 106. The imaging-unit control I/F 107 is, for example, an Ethernet (registered trademark)-compliant interface.

As shown in FIG. 8, the dimming control unit 9 of the parallax-value deriving system 15 includes an analyzing unit 200 (analyzing unit), and a dimming unit 201 (dimming unit).

The analyzing unit 200 is a circuit that analyzes whether or not there is an image abnormality in a brightness image or a parallax image that is received from the image processing unit 105 of the stereo camera 2. For example, the analyzing unit 200 detects presence or absence of a region in a state having blocked-out shadows or a saturated region in a subject or in a background portion around the subject, from the received brightness image. Moreover, the analyzing unit 200 detects presence or absence of a parallax-value discontinuous region due to reflection of the pattern light irradiated by the pattern emitting unit 8 in a subject or in a background portion, from the received parallax image. FIG. 9 depicts an example of a state in which, for example, when the analyzing unit 200 receives a reference image Ib_ex from the image processing unit 105 as the brightness image, reflection is imaged in a background region 400 around a part that appears in the reference image Ib_ex. In the imaging unit 106, the two imaging units are apart from each other by a predetermined distance as described above, and therefore, the reflection in the region 400 of the reference image Ib_ex shown in FIG. 9 appears at a different position in the comparison image. As a result, in a parallax image Ip_ex shown in FIG. 10 that is generated by the image processing unit 105, discontinuous parallax values are occurred in a background region 401. The reason for occurring discontinuous parallax values in a parallax image is not limited to reflection of the pattern light appearing in a brightness image as described above.

Furthermore, the analyzing unit 200 analyzes whether or not a texture is appropriately formed in a brightness image received from the image processing unit 105 of the stereo camera 2 as a result of dimming performed by the dimming unit 201, in other words, whether or not the texture is not blurry. In this case, the analyzing unit 200 calculates, for example, a degree of sharpness of the texture for the brightness image, compares with a predetermined threshold, and determines, when it is equal to or larger than the threshold, that the texture is appropriately formed.

The dimming unit 201 is a circuit that receives a result of analysis from the analyzing unit 200, and transmits an adjustment amount according to an image abnormality to the pattern emitting unit 8 when determining that there is an image abnormality, such as a state having blocked-out shadows or a saturated state in the brightness image, and a parallax-value discontinuous region included in the parallax image, based on the result of analysis. Specifically, the dimming unit 201 determines an adjustment amount according to the image abnormality from a light-amount adjustment table (not shown) in which an abnormality (a state having blocked-out shadows, a saturated state, discontinuity of parallax values, and the like) and an adjustment amount for a light amount of the pattern emitting unit 8 are associated, to transmit to the pattern emitting unit 8. Although the dimming unit 201 determines the adjustment amount according to an image abnormality based on the light-amount adjustment table, it is not limited to a table form, but may be information in any form as long as an image abnormality and an adjustment amount are associated with each other. Moreover, after performing the dimming of the pattern light by transmitting the adjustment amount to the pattern emitting unit 8, the dimming unit 201 receives light amount data from the pattern emitting unit 8.

The dimming unit 201 performs exposure adjustment, when determining that, based on the light amount data received from the pattern emitting unit 8, it has reached a dimming limit, namely no further dimming can be achieved, or when determining that, based on the result of analysis received from the analyzing unit 200, it is occurred such an image abnormality that a texture is not appropriately formed in the brightness image. Specifically, the dimming unit 201 transmits adjustment instruction information to adjust an exposure time to the imaging unit 106 as the exposure adjustment. The imaging unit 106 adjusts the exposure time at imaging in accordance with the adjustment instruction information received from the dimming unit 201.

Furthermore, when the result of analysis received from the analyzing unit 200 indicates that there is no image abnormality in the brightness image and the parallax image, the dimming unit 201 stops the dimming action to the pattern emitting unit 8 and the exposure adjustment action to the imaging unit 106. However, the analyzing unit 200 continues to analyze whether there is an image abnormality in a brightness image and a parallax image, and the dimming unit 201 continues to receive a result of analysis from the analyzing unit 200 and to receive light amount data from the pattern emitting unit 8.

Although the dimming unit 201 adjusts an exposure time for the imaging unit 106 as the exposure adjustment, it is not limited thereto. For example, the dimming unit 201 may simply add frames that are obtained by varying the exposure to various kinds of exposures per a captured image (frame) of the imaging unit 106, or by performing dynamic range expansion in which the frames are added after subjected to pixel value conversion such as gamma process, and the like.

As shown in FIG. 8, the pattern emitting unit 8 of the parallax-value deriving system 15 includes a light-amount adjusting unit 300, a light source unit 301, a texture filter 302, and a lens 303.

The light-amount adjusting unit 300 is a device that adjusts an amount of light emitted from the light source unit 301, by using the adjustment amount received from the dimming unit 201. Moreover, the light-amount adjusting unit 300 transmits the light amount data to the dimming unit 201 after adjusting the amount of light of the light source unit 301 based on the adjustment amount received from the dimming unit 201. The light source unit 301 is a light source that emits light by a light amount adjusted by the light-amount adjusting unit 300. The texture filter 302 is a filter to give a special pattern to the light emitted from the light source unit 301. The light from the light source unit 301 that has passed through the texture filter 302 travels toward the lens 303 as the pattern light. The lens 303 is an optical device that refracts the pattern light so that the pattern light that has passed through the texture filter 302 is irradiated to the subject in a diffused manner.

Although it has been explained that the analyzing unit 200, the dimming unit 201, and the light-amount adjusting unit 300 are implemented by hardware circuits, it is not limited thereto. That is, at least either one of the analyzing unit 200, the dimming unit 201, and the light-amount adjusting unit 300 may be implemented by executing a program, which is software, by a CPU and the like.

Furthermore, the hardware configuration of the analyzing unit 200, the dimming unit 201, and the light-amount adjusting unit 300 shown in FIG. 8 is one example, and is not limited to this hardware configuration.

Figure 11:
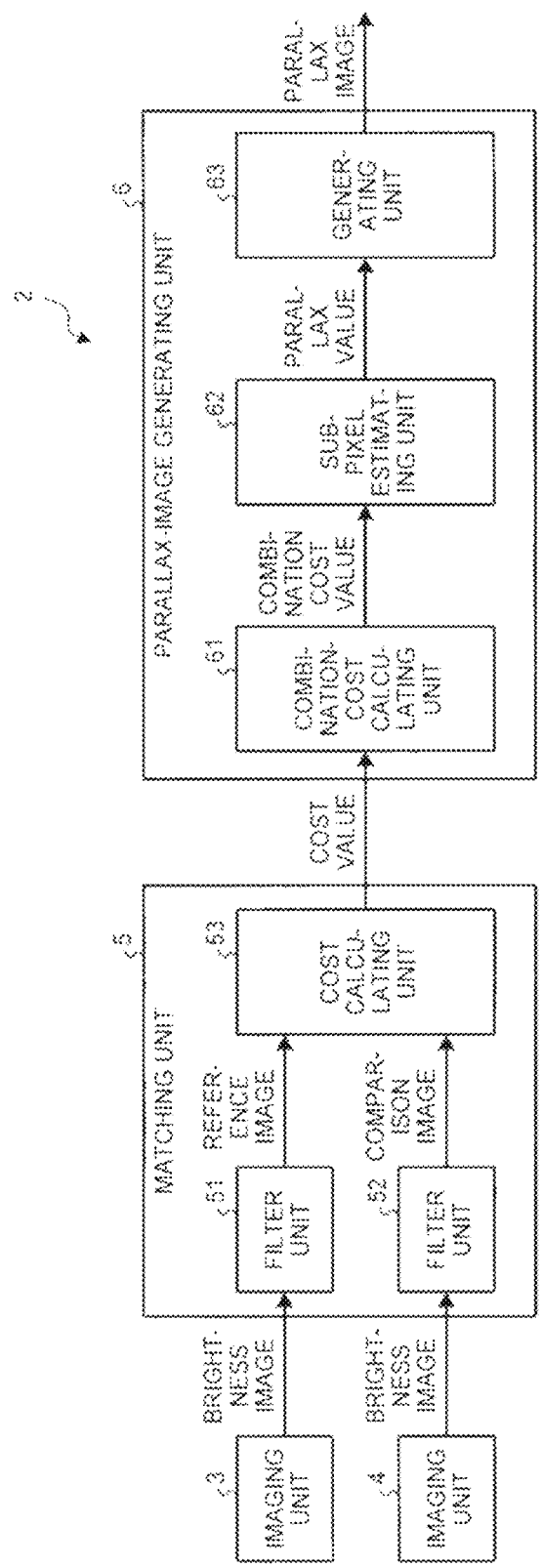
FIG. 11 is a block diagram illustrating one example of a configuration of functional blocks of a stereo camera of the present embodiment.
Figure 12:
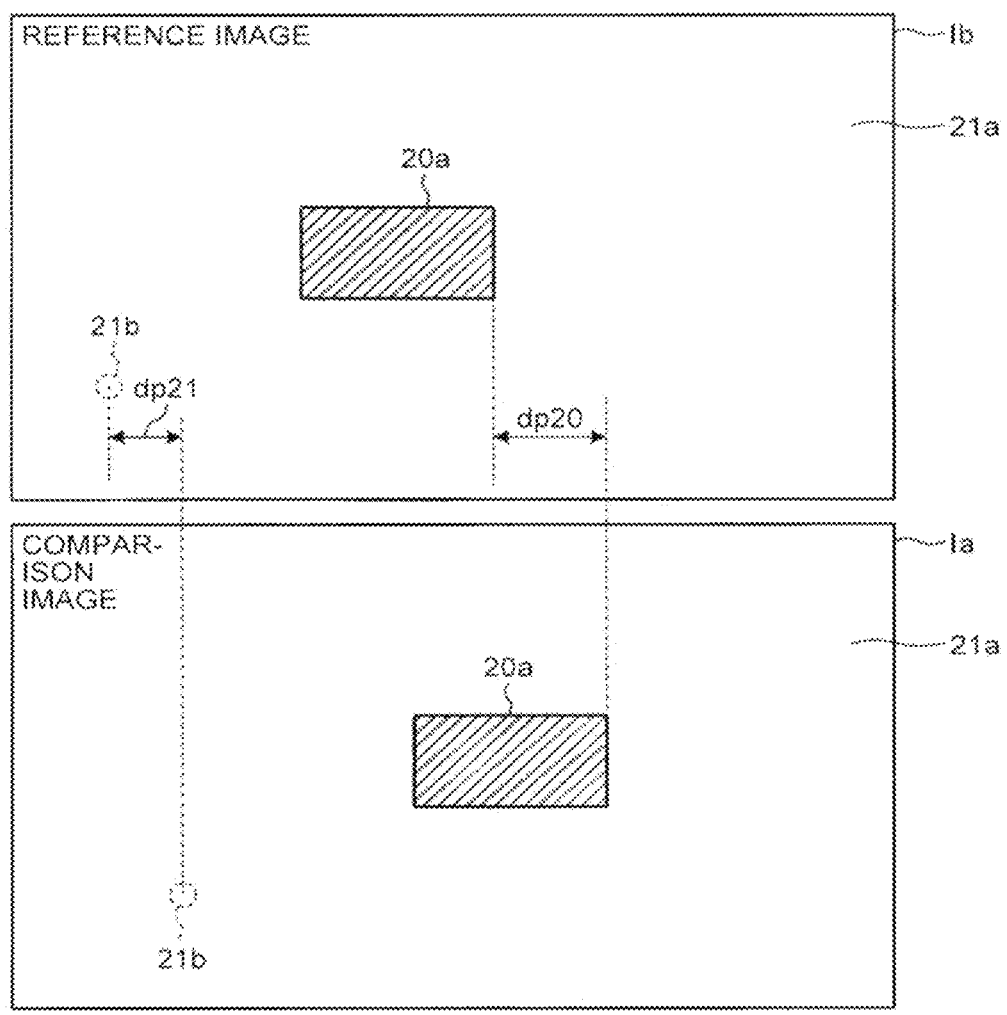
FIG. 12 is a diagram for explaining a parallax of a subject and a parallax of a background in the conveying system of the present embodiment.
Figure 13:
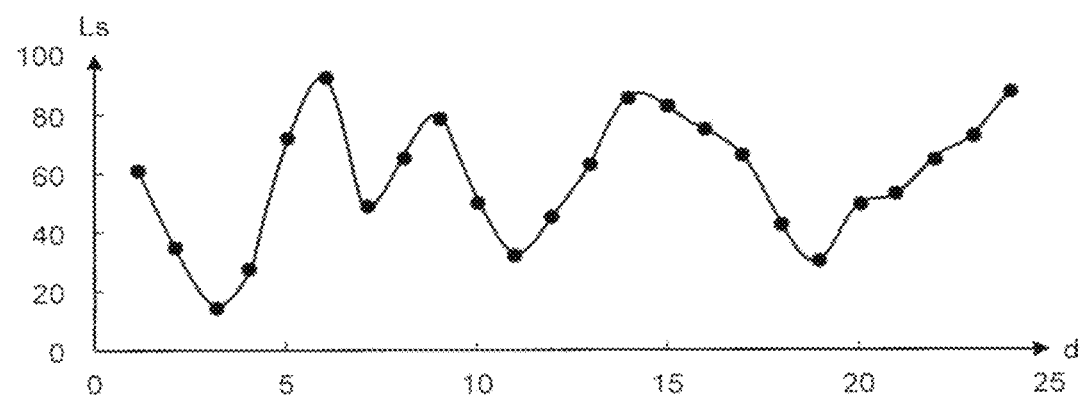
FIG. 13 is a diagram illustrating one example of relation between a shift amount and a combination cost value in the present embodiment.
Figure 14:
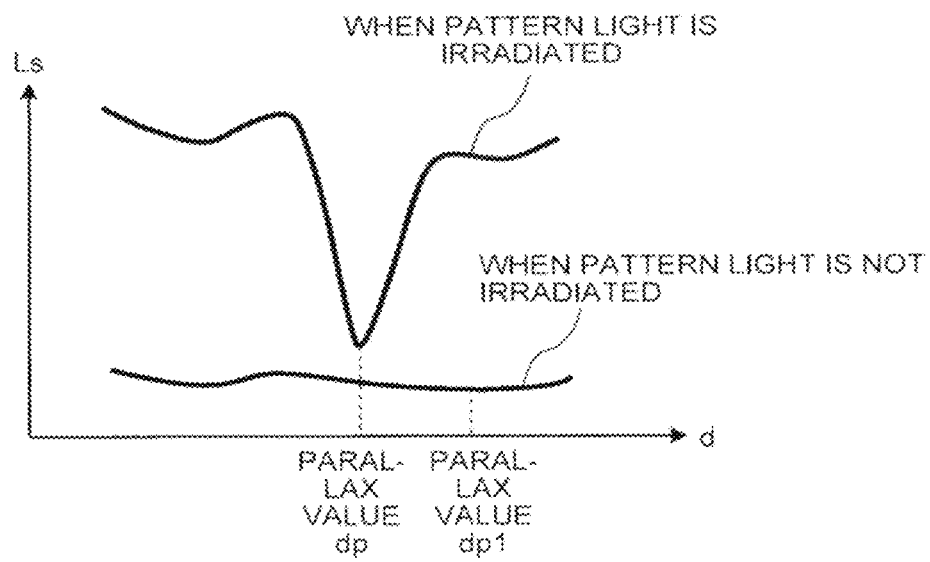
FIG. 14 is a diagram for explaining a graph of a combination cost value when pattern light is irradiated and not irradiated.
Figure 15:
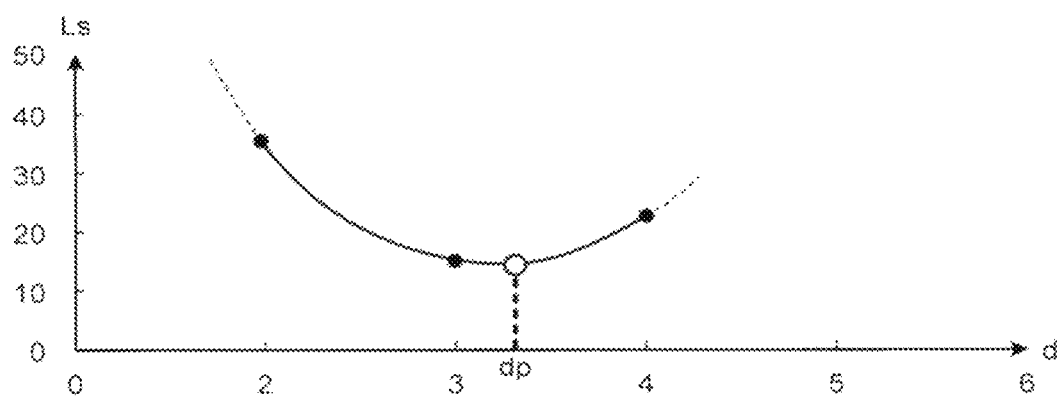
FIG. 15 is a diagram for explaining sub-pixel estimation by parabola fitting.
Figure 16:
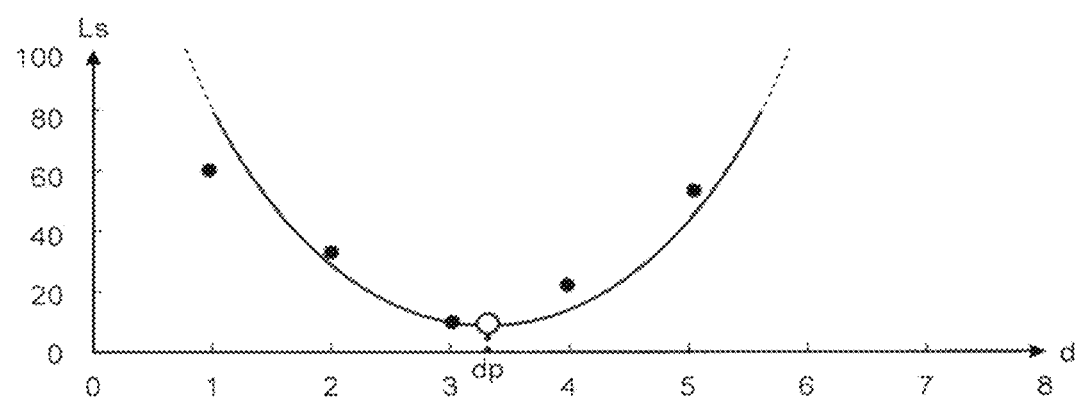
FIG. 16 is a diagram for explaining sub-pixel estimation by a least square method.

Functional Block Configuration of Stereo Camera and Action of Each Functional Block FIG. 11 is a block diagram showing one example of a configuration of functional blocks of the stereo camera of the present embodiment. FIG. 12 is a diagram for explaining a parallax of a subject and a parallax of a background in the conveying system of the present embodiment. FIG. 13 illustrates one example of relation between a shift amount and a combination cost value in the present embodiment. FIG. 14 is a diagram for explaining a graph of a combination cost value when pattern light is irradiated and not irradiated. FIG. 15 is a diagram for explaining sub-pixel estimation by parabola fitting. FIG. 16 is a diagram for explaining sub-pixel estimation by a least square method. With reference to FIGS. 11 to 16, it will be explained the functional block configuration of the stereo camera 2 according to the present embodiment and action of each functional block.

As shown in FIG. 11, the stereo camera 2 includes the imaging units 3 and 4, the matching unit 5, and the parallax-image generating unit 6.

Moreover, the imaging units 3 and 4 are fixed in a state of being apart from each other by a predetermined distance, and are functional units each of which images a subject to generate image data of analog format, and then converts the analog image data into image data of digital format to generate a brightness image. The imaging units 3 and 4 correspond to the imaging unit 106 shown in FIG. 8.

The matching unit 5 is a functional unit that calculates the cost value C that indicates a matching degree of each pixel in a comparison image with a reference pixel in a reference image, using the brightness images generated by the imaging units 3 and 4 as the reference image and the comparison image, respectively. The matching unit 5 includes filter units 51 and 52, and a cost calculating unit 53 (first calculating unit). The matching unit 5 is implemented by the image processing unit 105 shown in FIG. 8. Note that the brightness image generated by the imaging unit 3 may be used as the comparison image, and the brightness image generated by the imaging unit 4 may be used as the reference image.

The parallax-image generating unit 6 is a functional unit that generates a parallax image by using the cost value C received from the matching unit 5. The parallax-image generating unit 6 includes a combination-cost calculating unit 61 (second calculating unit), a sub-pixel estimating unit 62 (deriving unit), and a generating unit (generating unit). The parallax-image generating unit 6 is implemented by the image processing unit 105 shown in FIG. 8.

The filter units 51 and 52 are functional units that removes a noise from the brightness images generated by the imaging units 3 and 4, respectively. In this example, the brightness image from which a noise is removed by the filter unit 51 is the reference image Ib, and the brightness image from which a noise is removed by the filter unit 52 is the comparison image Ia.

The cost calculating unit 53 is a functional unit that calculates the cost value C(p, d) (matching degree) of the respective candidate pixels q(x+d, y) based on a brightness value of a reference pixel p(x, y) in the reference image Ib and on respective brightness values of the candidate pixels q(x+d, y) that are candidates of corresponding pixels (corresponding regions) identified by shifting by the shift amount d from a pixel corresponding to a position of the reference pixel p(x, y) on an epipolar line in the comparison image Ia based on the reference pixel p(x, y). As a calculation method of the cost value C by the cost calculating unit 53, for example, sum of absolute difference (SAD), sum of squared difference (SSD), normalized cross-correlation (NCC), or the like can be applied.

Moreover, in the case of conveying the part 20 in the conveying system 1 shown in FIG. 7, because the distance from the stereo camera 2 to the background portion 21 is fixed as shown in FIG. 12, a parallax value dp21 at a point 21b of a background region 21a in the reference image Ib and the comparison image Ia obtained by imaging the background potion 21 is information known in advance based on Equation (2) above. Therefore, the cost calculating unit 53 can determine a searching range of the candidate pixel q(x+q, y) by the shift amount d to a predetermined limited range for the reference pixel p(x, y), and can calculate the cost value C within the searching range. Thus, by determining a searching range for the candidate pixel q in advance, the parallax value dp20 of a part region 20a in the reference image Ib and the comparison image Ia can be derived accurately, and erroneous detection of a considerably different parallax value dp20 can be suppressed, and moreover, an operation load of the cost calculating unit 53 can be reduced.

Furthermore, an example of a graph showing one example of relation between the shift amount d and the cost value C calculated by the cost calculating unit 53 is the graph shown in FIG. 4 described above. In the graph shown in FIG. 4, when the shift amount d=5, 12, and 19, it takes a value approximated to the lowest value of the cost value C. Therefore, it is difficult to acquire a corresponding pixel in the comparison image Ia that corresponds to the reference pixel in the reference image Ib by calculating the lowest value of the cost value C.

The combination-cost calculating unit 61 is a functional unit that first calculates the path cost value Lr(p, d) in the predetermined r direction by Equation (3) above, to calculate the combination cost value Ls(p, d) (matching degree). The path cost value Lr(p, d) is a value that is calculated by aggregating the cost values C in the comparison image Ia for the reference pixel to the cost value C(p, d) of the candidate pixel q(x+d, y) that is calculated by the cost calculating unit 53 when a pixel adjacent to the reference pixel p(x, y) in the reference image Ib in the r direction is the reference pixel (second reference region) as indicated in Equation (3).

The combination-cost calculating unit 61 calculates, as shown in FIG. 5, the path cost values Lr, namely, $Lr_0$, $Lr_{45}$, $Lr_{90}$, $Lr_{135}$, $Lr_{180}$, $Lr_{225}$, $Lr_{270}$, and $Lr_{315}$, of 8 directions ($r_0$, $r_{45}$, $r_{90}$, $r_{135}$, $r_{180}$, $r_{225}$, $r_{270}$, and $r_{315}$), and finally calculates the combination cost value Ls(p, d) based on Equation (4) above. A graph showing relation between the shift amount d and the combination cost value Ls calculated by the combination-cost calculating unit 61 is the graph shown in FIG. 13. As shown in FIG. 13, the combination cost value Ls takes the lowest value when the shift amount d=3. Although the number of r direction is 8 in the above explanation, it is not limited thereto. For example, it may be 16 directions by further dividing each of the 8 directions into two, or may be 24 directions by dividing into three, or the like. Alternatively, the combination cost value Ls may be calculated by acquiring the path cost values Lr of either ones out of the 8 directions.

Furthermore, the graph showing relation between the shift amount d and the combination cost value Ls shown in FIG. 14 includes a graph of when a texture is formed by irradiating the pattern light to the part 20 by the pattern emitting unit 8, and a graph of when the pattern light is not irradiated and a texture is not formed. In the graph of when the texture is not formed, a parallax value dp1 corresponding to the lowest combination cost value Ls is acquired; however, the combination cost values Ls other than the combination cost value Ls at the parallax value pd1 are also analogous, and it cannot be regarded that a precise parallax value can be acquired. On the other hand, in the graph of when the texture is formed, the contrast in the calculated combination cost value Ls is large, and the lowest combination cost value Ls becomes clear. Accordingly, the parallax value dp can be accurately acquired.

The sub-pixel estimating unit 62 performs sub-pixel estimation based on the shift amount d of a pixel corresponding to the lowest value in the combination cost value Ls calculated by the combination-cost calculating unit 61 in the comparison image Ia with respect to the reference pixel in the reference image Ib, and on the combination cost value Ls at the shift amount d adjacent thereto. The graph of the combination cost value Ls shown in FIG. 13 is a graph of the combination cost value Ls with respect to the shift amount d in a pixel unit. Therefore, the lowest value of the combination cost value Ls in the graph shown in FIG. 13 is the combination cost value Ls at the shift amount d=3 in a pixel unit. That is, in a graph of the combination cost value Ls with respect to the shift amount d in a pixel unit as shown in FIG. 13, it is impossible to derive a value in a pixel unit as the parallax value dp. Therefore, the sub-pixel estimation is to estimate and derive the parallax value dp in a unit smaller than the pixel unit (hereinafter, sub-pixel unit), not as a value in a pixel unit. By this parallax value dp, a distance of a corresponding pixel to the subject can be calculated by Equation (2) above. That is, the parallax value dp is to be an index value of a distance to the subject.

First, with reference to FIG. 15, it will be explained a case in which the sub-pixel estimating unit 62 performs the sub-pixel estimation by the parabola fitting. The sub-pixel estimating unit 62 acquires a value of the shift amount d with which the combination cost value Ls takes the lowest value in the graph (refer to FIG. 13) of the combination cost value Ls calculated by the combination-cost calculating unit 61. In the example in FIG. 13, when the shift amount d=3, the combination cost value Ls takes the lowest value. Subsequently, the sub-pixel estimating unit 62 acquires the shift amount d adjacent to the shift amount d=3. Specifically, acquiring shift amount d=2, 4. Subsequently, the sub-pixel estimating unit 62 acquires a downward convex quadratic curve that passes through three points at the shift amounts d=2, 3, 4 as shown in FIG. 15, in the graph of the shift amount d and the combination cost value Is shown in FIG. 13. The sub-pixel estimating unit 62 then estimates that the shift amount d in the sub-pixel unit corresponding to the minimum value (extreme value) in the quadratic curve is the parallax value dp.

Next, with reference to FIG. 16, it will be explained a case in which the sub-pixel estimating unit 62 performs the sub-pixel estimation by the least square method. The sub-pixel estimating unit 62 acquires a value of the shift amount d with which the combination cost value Ls takes the lowest value in the graph (see FIG. 13) of the combination cost value Ls calculated by the combination-cost calculating unit 61. In the example shown in FIG. 13, when the shift amount d=3, the combination cost value Ls takes the lowest value. Subsequently, the sub-pixel estimating unit 62 acquires four values of the shift amount d close to the shift amount d=3. Specifically, acquiring shift amount d=1, 2, 4, 5. Subsequently, the sub-pixel estimating unit 62 acquires a downward convex quadratic curve that passes through five points at the shift amounts d=1, 2, 3, 4, 5 as shown in FIG. 16 by the least square method, in the graph of the shift amount d and the combination cost value Ls shown in FIG. 13. The sub-pixel estimating unit 62 then estimates that the shift amount d in the sub-pixel unit corresponding to the minimum value (extreme value) in the quadratic curve is the parallax value dp.

The sub-pixel estimating unit 62 estimates and derives the parallax value dp by the sub-pixel estimation by the parabola fitting shown in FIG. 15, or by the least square method shown in FIG. 16. Thus, the parallax value dp can be derived in the sub-pixel unit that is smaller than the pixel unit, and therefore, the highly-accurate and detailed parallax value dp can be derived.

The sub-pixel estimation is not limited to be performed by the parabola fitting or by the least square method described above, but the sub-pixel estimation may be performed by other methods. For example, the sub-pixel estimating unit 62 may perform the sub-pixel estimation by an isometric linear fitting in which isometric straight lines that pass through the three points, not a quadratic curve, are acquired using the three points shown in FIG. 15, to estimate the parallax value dp.

Moreover, although the five points on the graph shown in FIG. 16 are used to acquire the quadratic curve in the sub-pixel estimation by the least square method, it is not limited thereto, but the quadratic curve may be acquired by using the different number of points.

Furthermore, the parallax value dp in the sub-pixel unit is not limited to be calculated by the sub-pixel estimation performed by the sub-pixel estimating unit 62, but the parallax value dp may be calculated in the pixel unit without performing the sub-pixel estimation. In this case, the sub-pixel estimating unit 62 can regard the shift amount d corresponding to the lowest value in the combination cost value Ls calculated by the combination-cost calculating unit 61 of a pixel in the comparison image Ia with respect to the reference pixel in the reference image Ib, as the parallax value dp.

Furthermore, although such an estimation value that the smaller the value is, the more a pixel in the comparison image Ia analogizes to the reference pixel of the reference image Ib is used as the cost value C calculated by the cost calculating unit 53 and the combination cost value Ls calculated by the combination-cost calculating unit 61, it is not limited thereto. It may be used such an evaluation value that the larger the value is, the more a pixel analogizes thereto. In this case, in the quadratic curve acquired by the sub-pixel estimating unit 62 described above, the shift amount d in the sub-pixel unit corresponding to the maximum value is regarded as the parallax value dp.

The generating unit 63 is a functional unit that generates a parallax image Ip (highly-dense parallax image) that is an image in which a brightness value of each pixel in the reference image Ib is expressed by the parallax value dp corresponding to the pixel based on the parallax value dp in the sub-pixel unit derived by the sub-pixel estimating unit 62. Note that the parallax image Ip (image based on distance information) may be an image expressed not by the parallax value dp, but by distance information calculated from the parallax value dp.

Although it has been explained that the cost calculating unit 53, the combination-cost calculating unit 61, the sub-pixel estimating unit 62, and the generating unit 63 are implemented by hardware circuits, it is not limited thereto. That is, at least either one of the cost calculating unit 53, the combination-cost calculating unit 61, the sub-pixel estimating unit 62, and the generating unit 63 may be implemented by executing a program, which is software, by the CPU 100.

Furthermore, the block configuration of the filter unit 51, the filter unit 52, the cost calculating unit 53, the combination-cost calculating unit 61, the sub-pixel estimating unit 62, and the generating unit 63 shown in FIG. 11 is one in which the functions are conceptually illustrated, and is not limited to this block configuration.

Overall Operation of Conveying System

Figure 17:
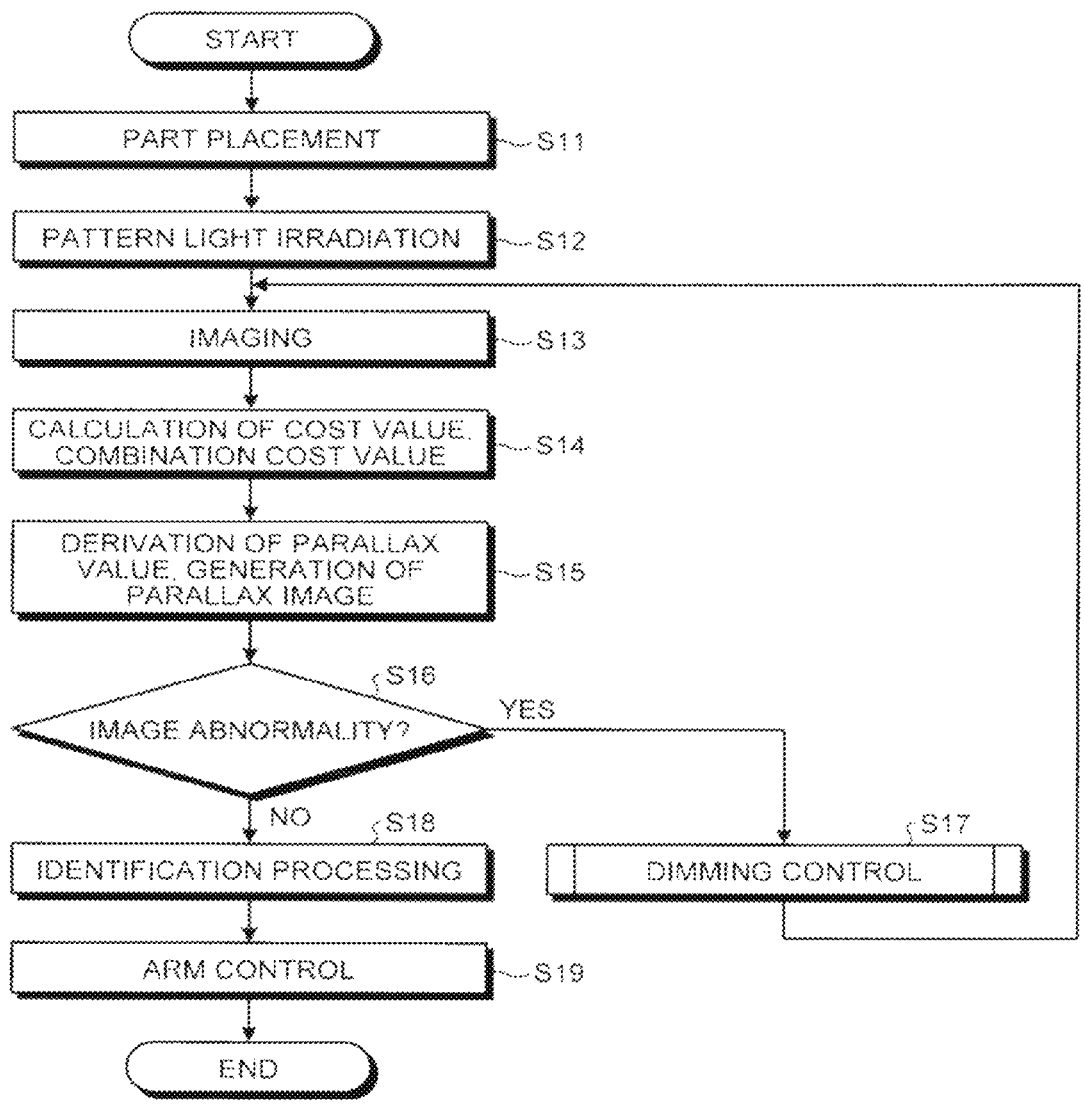
FIG. 17 is a flowchart of one example of operation of the conveying system of the present embodiment.

FIG. 17 is a flowchart indicating one example of operation of the conveying system of the present embodiment. With reference to FIG. 17, overall operation of the conveying system 1 including the image processing based on the stereo matching process (SGM method) of the parallax-value deriving system 15 according to the present embodiment is explained.

Step S11

As shown in FIG. 1, it is assumed that the part 20 is placed on the background portion 21, which is the stage. It may be assumed that the part 20 is placed on the background portion 21 from equipment in a previous process in the conveying system 1, or may be assumed that the part 20 is placed on the background portion 21 by an operator. The operation proceeds to step S12.

Step S12

The pattern emitting unit 8 of the parallax-value deriving system 15 irradiates the pattern light having a special pattern onto the part 20 placed on the background portion 21. Thus, a texture is formed on a surface of the part 20 and the background portion 21. The operation proceeds to step S13.

Step S13

Each of the imaging units 3 and 4 of the stereo camera 2 images the subject, to generate an image of analog format, converts the analog image into image data of digital format, and generates a brightness image. The filter unit 51 of the matching unit 5 in the stereo camera 2 removes a noise from the brightness image generated by the imaging unit 3 (imaging unit, first imaging unit), to output the reference image Ib. The filter unit 52 of the matching unit 5 in the stereo camera 2 removes a noise from the brightness image generated by the imaging unit 4 (imaging unit, second imaging unit), to output the comparison image Ia. The operation proceeds to step S14.

Step S14

The cost calculating unit 53 of the matching unit 5 in the stereo camera 2 calculates the cost value C(p, d) of each of the candidate pixels q(x+d, y) based on a brightness value of the reference pixel p(x, y) in the reference image Ib, and each of brightness values of the candidate pixels q(x+d, y) that are candidate pixels identified by shifting by the shift amount d from a pixel that corresponds to the position of the reference pixel p(x, y) on an epipolar line in the comparison image Ia based on the reference pixel p(x, y). As described above, because the distance from the stereo camera 2 to the background portion 21 is fixed, the cost calculating unit 53 can set a searching range to calculate the cost value C of the candidate pixels q(x+d, y) based on the shift amount d to a predetermined limited range.

The combination-cost calculating unit 61 of the parallax-image generating unit 6 in the stereo camera 2 calculates the path cost value Lr(p, d) that is calculated by aggregating the cost values C in the comparison image Ia for the reference pixel to the cost value C(p, d) of the candidate pixels q(x+d, y) that is calculated by the cost calculating unit 53 when a pixel adjacent to the reference pixel p(x, y) in the reference image Ib in the r direction is the reference pixel, based on Equation (3). The combination-cost calculating unit 61 calculates, as shown in FIG. 5, the path cost values Lr, namely, $Lr_0$, $Lr_{45}$, $Lr_{90}$, $Lr_{135}$, $Lr_{180}$, $Lr_{225}$, $Lr_{270}$, and $Lr_{315}$, of 8 directions ($r_0$, $r_{45}$, $r_{90}$, $r_{135}$, $r_{180}$, $r_{225}$, $r_{270}$, and $r_{315}$), and finally calculates the combination cost value Ls(p, d) based on Equation (4) described above. The operation proceeds to step S15.

Step S15

The sub-pixel estimating unit 62 of the parallax-image generating unit 6 in the stereo camera 2 performs sub-pixel estimation based on the shift amount d of a pixel corresponding to the lowest value in the combination cost value Ls calculated by the combination-cost calculating unit 61 in the comparison image Ia with respect to the reference pixel in the reference image Ib, and on the combination cost value Ls at the shift amount d adjacent thereto. The sub-pixel estimating unit 62 then estimates that the shift amount d in the sub-pixel unit corresponding to the minimum value in an approximate curve (downward convex quadratic curve in FIG. 15 and FIG. 16) acquired by the sub-pixel estimation is the parallax value dp, thereby deriving the parallax value dp.

The generating unit 63 of the parallax-image generating unit 6 in the stereo camera 2 generates the parallax image Ip (highly-dense parallax image) that is an image in which a brightness value of each pixel in the reference image Ib is expressed by the parallax value dp corresponding to the pixel based on the parallax value dp in the sub-pixel unit derived by the sub-pixel estimating unit 62. The stereo camera 2 outputs the brightness image output from the imaging unit 3 or the imaging unit 4 and the parallax image Ip generated by the generating unit 63. The operation proceeds to step S16.

Step S16

The analyzing unit 200 of the dimming control unit 9 analyzes whether or not there is an image abnormality in the brightness image or the parallax image Ip that is received from the stereo camera 2. As a result of the analysis, when there is an image abnormality (step S16: YES), the operation proceeds to step S17, and when there is no image abnormality (step S16: NO), the operation proceeds to step S18.

Step S17

When the analyzing unit 200 determines that there is an image abnormality in the brightness image or in the parallax image Ip, the dimming control unit 9 performs dimming control for the pattern light to be irradiated to the part 20 by the pattern emitting unit 8. Details of the dimming control are described later with reference to FIG. 18. After performing the dimming control by the dimming control unit 9, the operation returns to step S13.

Step S18

When the analyzing unit 200 determines that there is no image abnormality in the brightness image or in the parallax image Ip, the identification processing unit 7 identifies a shape, a position, a distance, and the like of the part 20 that is imaged by the stereo camera 2 based on the brightness image and the parallax image output by the stereo camera 2. The operation proceeds to step S19.

Step S19

The arm control unit 10 performs control to cause the arm 11, which is an articulated robot, or the like, to hold the part 20 and convey the part 20 to a destination based on the identification result made by the identification processing unit 7 for the part 20.

By the operation described above, overall operation of the conveying system 1 including the image processing based on the stereo matching process (SGM method) of the parallax-value deriving system 15 is performed.

Dimming Control

FIG. 18 is a flowchart indicating one example of operation of the dimming control of the present embodiment. It will be explained, with reference to FIG. 18, the dimming control for the pattern emitting unit 8 performed by the dimming control unit t9.

As described above, when the analyzing unit 200 determines that there is an abnormality in the brightness image or in the parallax image Ip, the dimming control unit 9 performs the dimming control for the pattern light to be irradiated to the part 20 by the pattern emitting unit 8. In this case, the dimming control unit 9 analyzes whether or not there is an image abnormality in the brightness image received from the stereo camera 2 at steps S171, S172, and S173. Moreover, the dimming control unit 9 analyzes whether or not there is an image abnormality in the parallax image Ip received from the stereo camera 2 at step S174.

Step S171

The analyzing unit 200 of the dimming control unit 9 analyzes whether or not there is a region in a state having blocked-out shadows or a saturated state in a background portion around the subject, from the brightness image received from the stereo camera 2. When there is a region in a state having blocked-out shadows or a saturated state in the background portion (step S171: YES), the operation proceeds to step S175, and when there is not (step S171: NO), the operation proceeds to step S172.

Step S172

The analyzing unit 200 analyzes whether or not there is a region in a state having blocked-out shadows or a saturated state in the subject from the brightness image received from the stereo camera 2. When there is a region in a state having blocked-out shadows or a saturated state in the subject (step S172: YES), the operation proceeds to step S175, and when there is not (step S172: NO), the operation proceeds to step S173.

Step S173

The analyzing unit 200 analyzes whether or not a texture is appropriately formed, that is, whether or not the texture is not blurry, in the brightness image received from the stereo camera 2. When the texture is blurry (step S173: YES), the operation proceeds to step S177, and when not blurry (step S173: NO), the analyzing unit 200 determines that there is no image abnormality in the brightness image.

Step S174

The analyzing unit 200 analyzes whether or not there is a parallax-value discontinuous region due to reflection of the pattern light irradiated by the pattern emitting unit 8 in the subject or in the background portion, based on the parallax image Ip received from the stereo camera 2. When there is a parallax-value discontinuous region (step S174: YES), the operation proceeds to step S175, and when there is not (step S174: NO), the analyzing unit 200 determines that there is not image abnormality in the parallax image.

Step S175

The analyzing unit 200 transmits a result of analysis indicating that there is an image abnormality, such as a state having blocked-out shadows or a saturated state in the brightness image, and a parallax-value discontinuous region included in the parallax image, to the dimming unit 201. The dimming unit 201 transmits an adjustment amount according to the image abnormality indicated by the result of analysis received from the analyzing unit 200, to the pattern emitting unit 8. Specifically, the dimming unit 201 determines an adjustment amount according to the image abnormality from the light-amount adjustment table in which an image abnormality and an adjustment amount for a light amount of the pattern emitting unit 8 are associated, to transmit to the pattern emitting unit 8. The light-amount adjusting unit 300 of the pattern emitting unit 8 adjusts an amount of light emitted from the light source unit 301, by using the adjustment amount received from the dimming unit 201. The light emitted from the light source unit 301 passes through the texture filter 302 and the lens 303 to be irradiated to the subject as the pattern light. The operation proceeds to step S176.

Step S176

After performing the dimming of the pattern light by transmitting the adjustment amount to the light-amount adjusting unit 300 of the pattern emitting unit 8, the dimming unit 201 received light amount data from the light-amount adjusting unit 300. The dimming unit 201 determines whether or not it has reached the dimming limit, that is, whether or not dimming cannot be achieved any further, based on the light amount data received from the pattern emitting unit 8. When it has reached the dimming limit (step S176: YES), the operation proceeds to step S177, and when it has not reached the dimming limit (step S176: NO), the dimming unit 201 determines that further dimming for the pattern emitting unit 8 is possible.

Step S177

The dimming unit 201 performs exposure adjustment, when determining that it has reached the dimming limit, that is, when determining that no further dimming can be achieved, based on the light amount data received from the pattern emitting unit 8, or when determining that such an image abnormality that a texture is blurry in the brightness image, based on the result of analysis received from the analyzing unit 200. Specifically, the dimming unit 201 transmits adjustment instruction information to adjust an exposure time to the imaging unit 106 as the exposure adjustment. The imaging unit 106 adjusts the exposure time at imaging, according to the adjustment instruction information received from the dimming unit 201.

When there is no image abnormality in either of the brightness image and the parallax image, or when there is an image abnormality in at least either one of the brightness image and the parallax image, and it has not reached the dimming limit even after the dimming operation, or when the exposure adjustment operation is performed, by a series of operation described above, the dimming control is ended.

As described above, the pattern emitting unit 8 irradiates the pattern light having a special pattern to the subject, each of the imaging units 3 and 4 generates a brightness image (reference image Ib, comparison image Ia) by imaging the subject, the stereo camera 2 derives the parallax value dp by the stereo matching process from the reference image Ib and the comparison image Ia, to generate the parallax image Ip from the parallax value dp. The analyzing unit 200 analyzes whether or not there is an image abnormality in the brightness image or the parallax image Ip, and when determining that there is an image abnormality, the dimming control unit 9 performs the dimming control for the pattern light to be irradiated by the pattern emitting unit 8. Thus, even when an image abnormality occurs in a brightness image that is obtained by imaging a subject in a state in which the pattern light is irradiated thereon, and a parallax image based thereon, imaging of the subject can be performed again in a state in which the image abnormality is solved by performing the dimming control for the pattern light to be irradiated. Accordingly, a highly accurate parallax value can be derived by the stereo matching process. Therefore, the accuracy in identifying a subject can be improved.

As the dimming control described above, specifically, when the analyzing unit 200 detects a presence of a region in a state having blocked-out shadows or a saturated state in a brightness image, or a presence of a parallax-value discontinuous region due to reflection of the pattern light in a parallax image, the dimming unit 201 performs the dimming operation for the pattern emitting unit 8. Moreover, when determining that it has reached the dimming limit as a result of the dimming operation based on the light amount data received from the pattern emitting unit 8, or when determining that such an image abnormality that a texture is not appropriately formed in the brightness image has occurred from the result of analysis received form the analyzing unit 200, the dimming unit 201 performs the exposure adjustment. By such operation, image abnormalities in the brightness image and the parallax image can be solved or reduced, thereby contributing derivation of a highly accurate parallax value.

Moreover, the stereo camera 2 is enabled to derive a highly accurate parallax value by calculating a combination cost value by the stereo matching process by the SGM method, as described above, even in a case where there is in the image a part weaken in texture. Note that because a texture is formed on a subject by the pattern light on which the dimming control is performed in the present embodiment, the stereo camera 2 is not necessarily required to perform the stereo matching process by the SGM method, and may perform the stereo matching process not by the SGM method, but by a normal block matching, and the like.

External Configuration of Stereo Camera

Figure 19A:
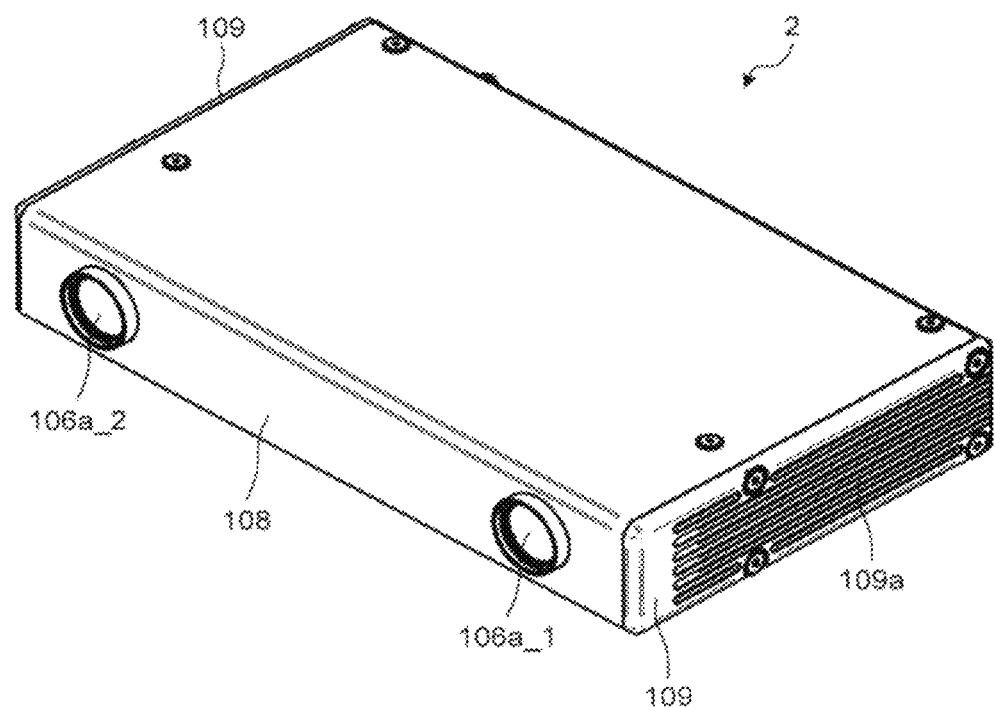
FIGS. 19A and 19B are diagrams illustrating an external perspective view of one example of the stereo camera of the present embodiment.
Figure 19B:
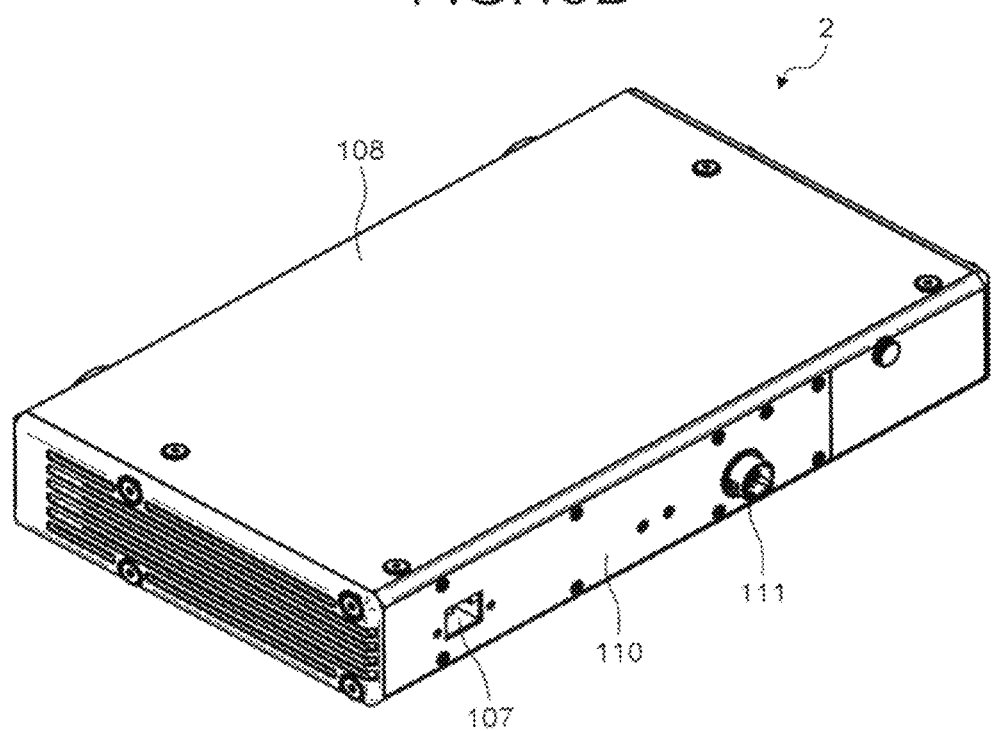
Figure 20A:
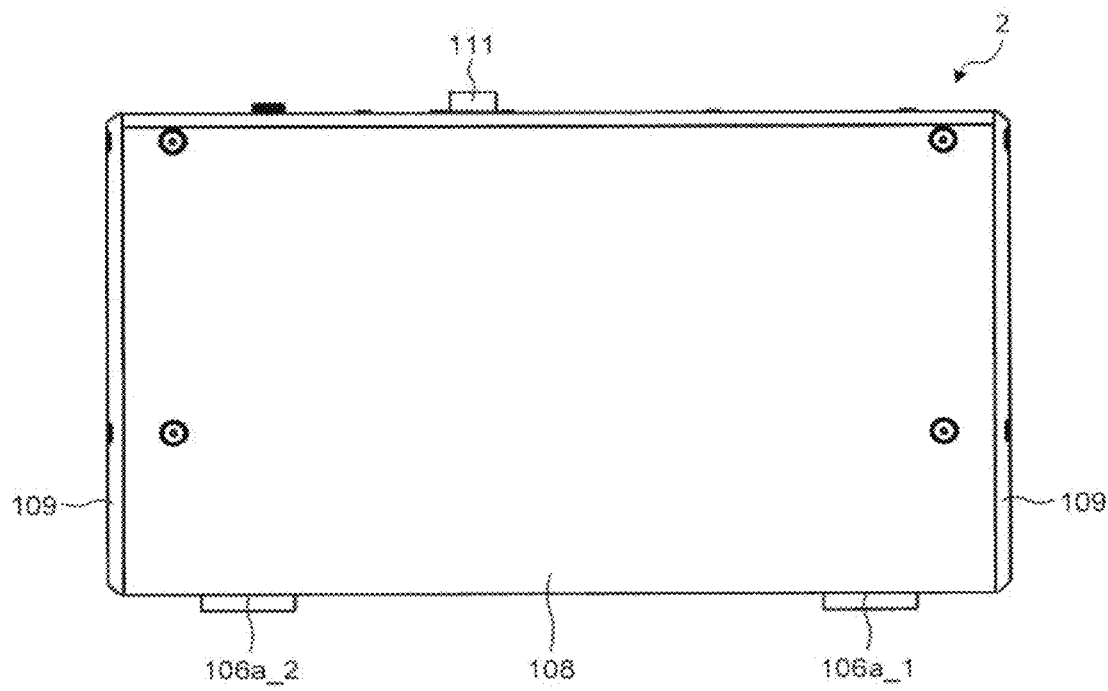
FIGS. 20A and 20B are respectively a plan view and a bottom view of the one example of the stereo camera of the present embodiment.
Figure 20B:
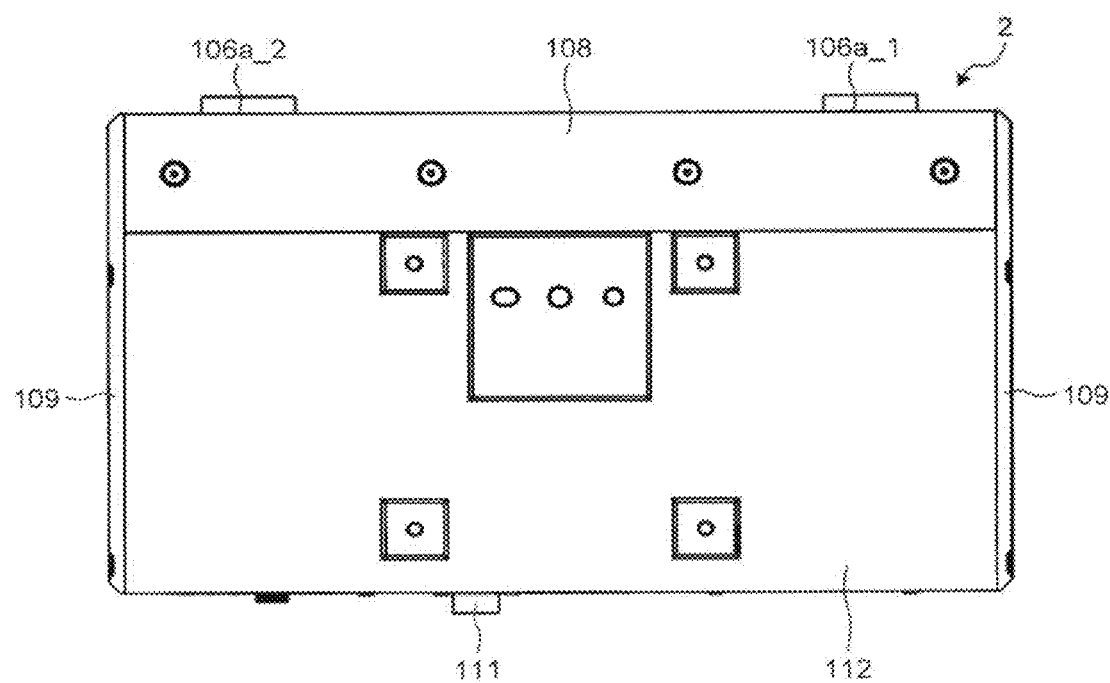

FIGS. 19A and 19B illustrate an external perspective view of one example of the stereo camera of the present embodiment. FIGS. 20A and 20B are diagrams illustrating respectively a plan view and a bottom view of the one example of the stereo camera of the present embodiment. FIGS. 21A, 21B, 21C, and 21D are diagrams illustrating respectively a front view, a rear view, and a side view of the one example of the stereo camera of the present embodiment. Referring to FIGS. 19A to 21D, the external configuration of the stereo camera 2 of the present embodiment is explained.

Figure 21A:
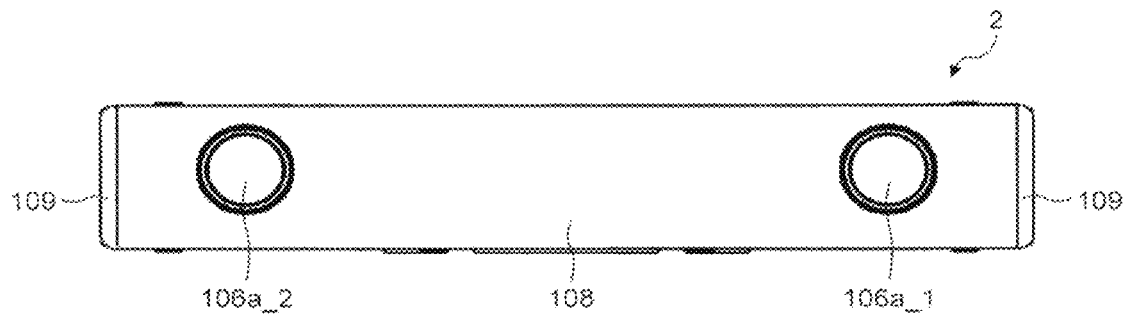
FIGS. 21A, 21B, 21C, and 21D are respectively a front view, a rear view, and a side view of the one example of the stereo camera of the present embodiment.
Figure 21B:
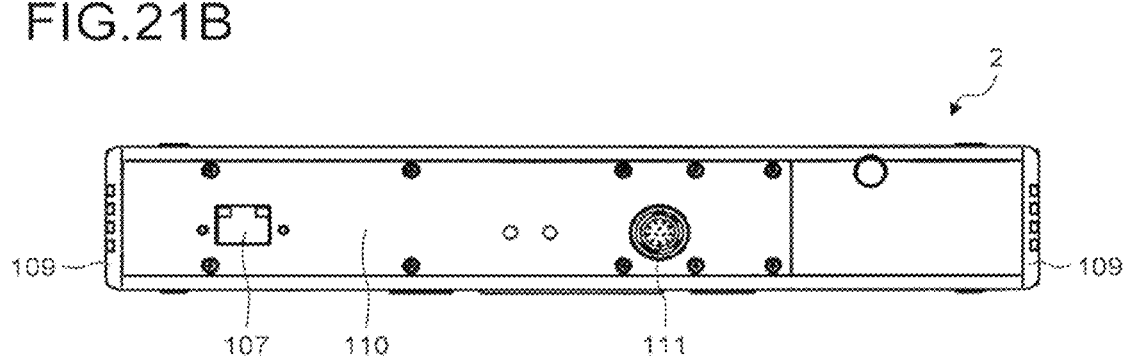
Figure 21C:
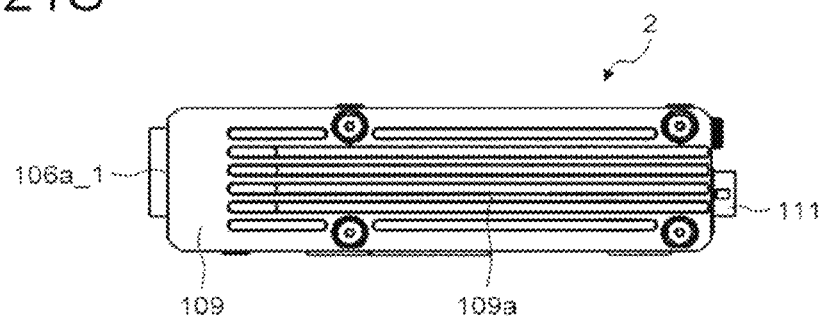
Figure 21D:
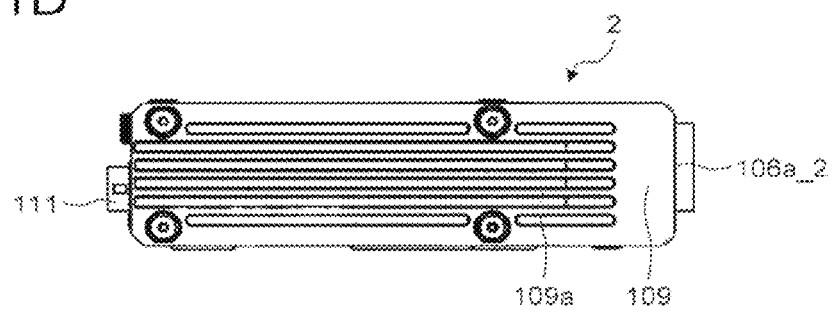

FIG. 19A is a perspective view from a front side of the one example of the stereo camera 2. FIG. 19B is a perspective view from a rear side of the one example of the stereo camera 2. FIG. 20A is a plan view of the one example of the stereo camera 2. FIG. 20B is a bottom view of the one example of the stereo camera 2. FIG. 21A is a front view of the one example of the stereo camera 2. FIG. 21B is a rear view of the one example of the stereo camera 2. FIG. 21C is a right side view of the one example of the stereo camera 2. FIG. 21D is a left side view of the one example of the stereo camera 2. As shown in FIGS. 19A to 21D, the stereo camera 2 includes lenses 106$a$_1 and 106$a$_2, the imaging-unit control I/F 107, a front cover 108, a side cover 109, a rear cover 110, a power source connector 111, and a bottom cover 112.

The lenses 106$a$_1 and 106$a$_2 are lenses corresponding to the lens 106$a$ of the imaging unit 106 shown in FIG. 8, and are optical devices that refract incident light to form an image of an object at the image sensor 106$c$ (refer to FIG. 8). As shown in FIGS. 19A and 21A, the lenses 106$a$_1 and 106$a$_2 fixed on a front surface side of the front cover 108 in a state of being apart from each other at a predetermined interval.

The imaging-unit control I/F 107 is arranged on the rear cover 110 of the stereo camera 2, and the function thereof is as described above in FIG. 8.

The front cover 108 is a cover that covers an interior from a top surface, a front surface (front side), and a part on a bottom side of the stereo camera 2. As shown in FIG. 19A, the front cover 108 has a form in which a ridge line formed with the front surface and the top surface, and a ridge line formed with the front surface and the bottom surface are chamfered.

The side cover 109 is a cover that covers both of side surfaces (a right side surface and a left side surface) of the stereo camera 2. As shown in FIGS. 20A and 20B, the side cover 109 has a form in which ridge lines formed with the side surface and the top surface, and the bottom surface are chamfered. Moreover, as shown in FIGS. 21A and 21B, the side cover 109 has a form in which ridge lines formed with the side surface, the top surface, and the bottom surface are chamfered. Furthermore, the side cover 109 has a dissipation fin 109$a$. The dissipation fin 109$a$ is a fin that dissipates heat generated by the CPU 100, the image processing unit 105, and the like (refer to FIG. 8) equipped in the stereo camera 2 to the outside.

The rear cover 110 is a cover that covers a rear surface of the stereo camera 2. As shown in FIGS. 19B, 21C, and 21D, the rear cover 110 and the front cover 108 are formed in a chamfered manner that a ridge line is not formed with the bottom surface and the top surface. As shown in FIGS. 19B, 20B, 21C, and 21D, the rear cover 110 and the bottom cover 112 are formed in a chamfered manner that ridge lines are not formed with the rear surface and the bottom surface.

The power source connector 111 is arranged on the rear cover 110 of the stereo camera 2, and is a connector to supply a power source to each unit included in the stereo camera 2 shown in FIG. 8.

The bottom cover 112 is a cover that covers a portion that is not covered by the front cover 108, out of the bottom surface of the stereo camera 2.

As described above, the stereo camera 2 has a structure in which ridge lines on an entire perimeter of the front surface (front side) and the rear side are chamfered.

First Modification

Figure 22:
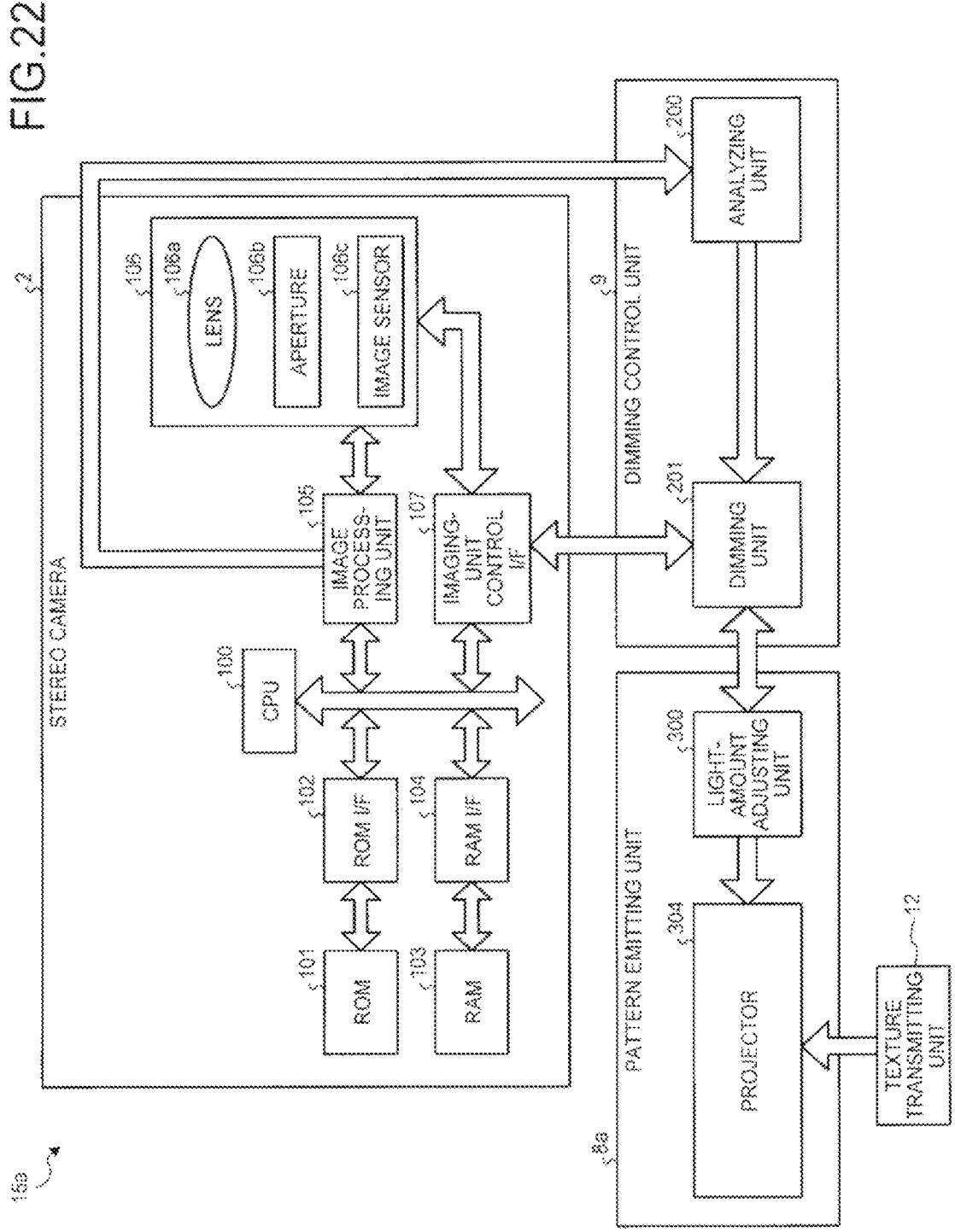
FIG. 22 is a diagram illustrating one example of a hardware configuration of a parallax-value deriving system according to a first modification of the present embodiment.

FIG. 22 illustrates one example of a hardware configuration of a parallax-value deriving system according to a first modification of the present embodiment. Referring to FIG. 22, a parallax-value deriving system 15a according to the present modification is explained mainly about a point that is different from the parallax-value deriving system 15 of the present embodiment described above. Because the stereo camera 2 and the dimming control unit 9 shown in FIG. 22 are the same as those shown in FIG. 8 of the embodiment described above, the same reference symbols are given and explanations thereof are omitted herein.

As shown in FIG. 22, the parallax-value deriving system 15a according to the present modification includes the stereo camera 2, a pattern emitting unit 8a, the dimming control unit 9, and a texture transmitting unit 12 (transmitting unit). Among these, the pattern emitting unit 8a is a device that irradiates pattern light having a special pattern to the part 20 (see FIG. 7) to be a subject of the imaging units 3 and 4 (see FIG. 7). The pattern emitting unit 8a includes the light-amount adjusting unit 300, and a projector 304.

The light-amount adjusting unit 300 is a device that adjusts an amount of light to be projected from the projector 304 by using an adjustment amount received from the dimming unit 201. Moreover, the light-amount adjusting unit 300 transmits light amount data to the dimming unit 201 after adjusting the amount of light of the projector 304 by using the adjustment amount received from the dimming unit 201.

The projector 304 includes an optical filter, a micro mirror device, a lens, a lamp, and the like, and is a device that projects pattern light having a special pattern based on texture data that is transmitted from the texture transmitting unit 12. The texture transmitting unit 12 is a device that transmits texture data (texture information) to determine a figure, a pattern, an arrangement, color, dots, and the like that is formed by the pattern light projected from the projector 304 being irradiated on the subject.

As described above, by applying the ready-made projector 304, as a device that irradiates the pattern light, a development cost can be reduced. Moreover, because the projector 304 generates the pattern light based on the texture data that is transmitted from the texture transmitting unit 12, a texture to be formed on a subject can be flexibly changed. Accordingly, a texture can be formed in such a manner that an image abnormality, such as a blocked-out shadow state, a saturated state, and a discontinuity in parallax values, is less likely to occur. Therefore, the accuracy in identifying a subject can be improved.

Second Modification

Figure 23:
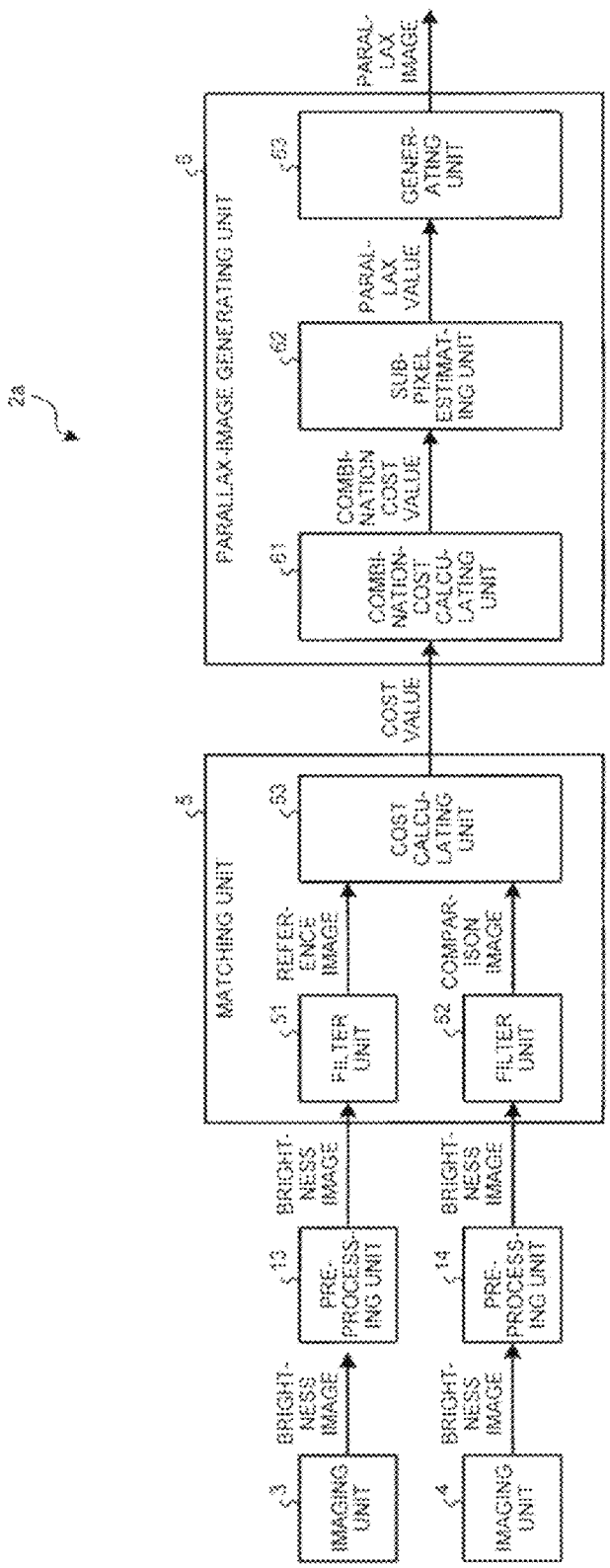
FIG. 23 is a diagram illustrating one example of functional blocks of a stereo camera of a second modification of the present embodiment.

FIG. 23 is a diagram illustrating one example of functional blocks of a stereo camera of a second modification of the present embodiment. Referring to FIG. 23, a stereo camera 2a of the present modification is explained mainly about a point different from the stereo camera 2 of the above embodiment. Because the imaging units 3 and 4, the matching unit 5, and the parallax-image generating unit 6 shown in FIG. 23 are the same as those shown in FIG. 11 of the embodiment described above, the same reference symbols are given and explanation thereof is omitted herein.

As shown in FIG. 23, the stereo camera 2a includes the imaging units 3 and 4, preprocessing units 13 and 14 (first preprocessing unit, second preprocessing unit), the matching unit 5, and the parallax-image generating unit 6.

The preprocessing units 13 and 14 are devices that perform image processing, such as distortion correction and dynamic range expansion, on brightness images generated by the imaging units 3 and 4, respectively as preprocessing. The preprocessing units 13 and 14 transmit the preprocessed brightness images to the filter units 51 and 52, respectively. Although the preprocessing unit 13 and the preprocessing unit 14 are shown as separate functional units in FIG. 23, it may be configured as a unified functional unit.

As described, by performing the dynamic range expansion by the preprocessing units 13 and 14 as the preprocessing on the brightness images generated by the imaging units 3 and 4, respectively, occurrence of a state having blocked-out shadows or a saturated state in the reference image Ib or the comparison image Ia can be suppressed when a parallax value is derived at the matching unit 5 and the parallax-image generating unit 6. Moreover, by performing the distortion correction by the preprocessing units 13 and 14 as the preprocessing on the brightness images generated by the imaging units 3 and 4, respectively, a distorted state in the reference image Ib and the comparison image Ia that affects the accuracy in calculating the cost value C by the matching unit 5 can be reduced. Accordingly, the accuracy in calculating the cost value C by the matching unit 5 can be improved. Therefore, the accuracy in identifying a subject can be improved.

Third Modification

Figure 24:
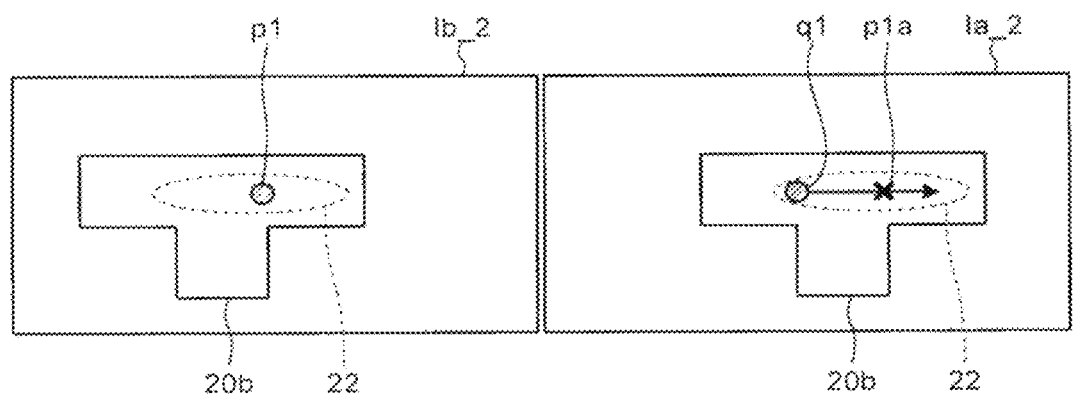
FIG. 24 is an explanatory diagram for a case of calculating a corresponding pixel in a comparison image that corresponds to a reference pixel in a reference image in a parallax-value deriving system according to a third modification of the present embodiment.

FIG. 24 is an explanatory diagram for a case of calculating a corresponding pixel in a comparison image that corresponds to a reference pixel in a reference image in a parallax-value deriving system according to a third modification of the present embodiment. With Reference to FIG. 24, operation of the parallax-value deriving system according to the present modification is explained mainly about a point different from the parallax-value deriving system 15 of the embodiment described above.

As shown in FIG. 24, it is considered a case in which a saturated region 22 is formed in a part region 20b that is a portion in which a part is imaged in a comparison image Ia_2 (or reference image Ib_2) due to reflection of the part. When it is performed searching (in a direction of arrow in FIG. 24) to calculate the cost value C from a candidate region q1 in the saturated region 22 of the comparison image Ia_2 with respect to a reference region p1 in the saturated region 22 of the reference image Ib_2, because any of pixel values in the candidate region is in a saturated state, a parallax value of a corresponding region (a corresponding region p1a in FIG. 24) that corresponds to the reference region p1 cannot be derived. Therefore, the cost calculating unit 53 (refer to FIG. 11) determines a predetermined range as for a searching range to calculate the cost value C, and when pixel values (brightness values) are successively equal to or higher than a predetermined value (first value) enabling to regard as a saturated state, it is determined that a saturated state occurs in the predetermined range. Subsequently, the cost calculating unit 53 transmits a result of determination to the dimming control unit 9, and the analyzing unit 200 of the dimming control unit 9 analyzes that there is a region in a saturated state in the brightness image (comparison image Ia_2 (or reference image Ib_2)). When determined that there is an image abnormality in the brightness image by the analyzing unit 200, the dimming control unit 9 performs dimming control for the pattern light to be irradiated to the part by the pattern emitting unit 8.

Although a case in which the brightness value is saturated has been explained as described above, it is not limited thereto. When a state in which the brightness value is low, namely so-called a state having blocked-out shadows is occurred, the dimming control unit 9 may perform dimming control as below. The cost calculating unit 53 (see FIG. 11) determines a predetermined range as for a searching range to calculate the cost value C, and when pixel values (brightness values) are successively equal to or lower than a predetermined value (second value) enabling to regard as a state having blocked-out shadows in the predetermined range and more, it is determined that the predetermined range is in a state having blocked-out shadows. The second value is a value smaller than the first value. Subsequently, the cost calculating unit 53 transmits a result of determination to the dimming control unit 9, and the analyzing unit 200 of the dimming control unit 9 analyzes that there is a region in a state having blocked-out shadows in the brightness image (comparison image Ia_2 (or reference image Ib_2)). When determined that there is an image abnormality in the brightness image by the analyzing unit 200, the dimming control unit 9 performs dimming control for the pattern light to be irradiated to the part by the pattern emitting unit 8.

This enables to determine whether or not a region in a saturated state is present in a brightness image at a stage of calculating the cost value C by the cost calculating unit 53, and therefore, by performing the dimming control early, it is possible to cause the pattern emitting unit 8 to irradiate a pattern light that enables to improve the accuracy in identifying a subject.

Fourth Modification

Figure 25A:
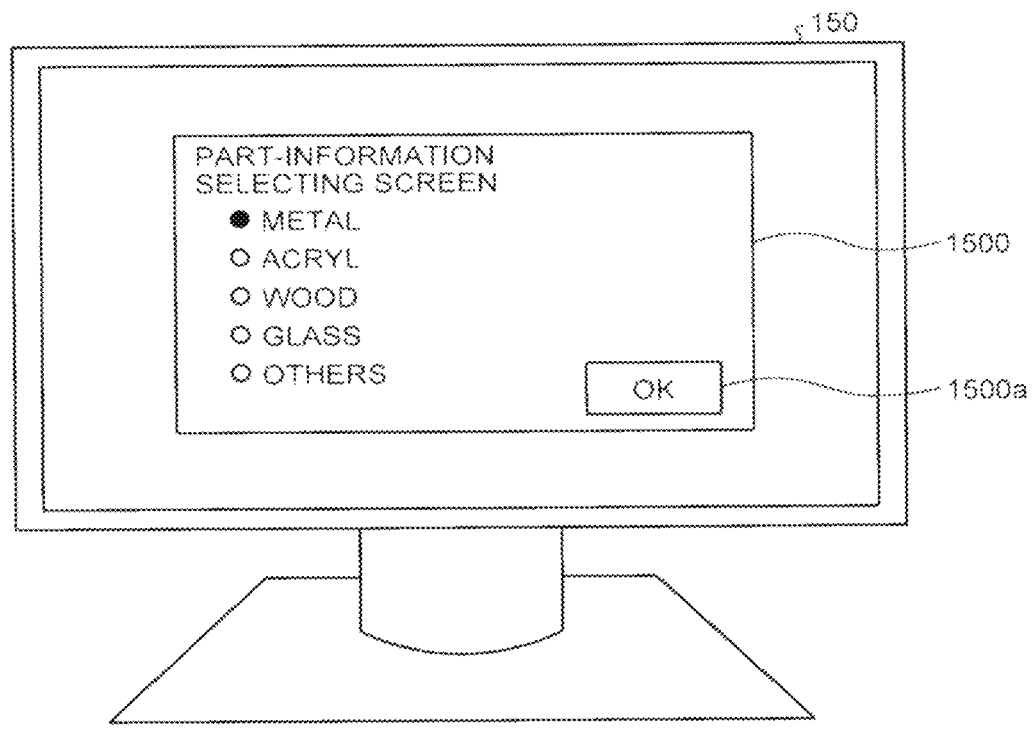
FIGS. 25A and 25B are diagrams illustrating respectively one example of a part-information selecting screen in a parallax-value deriving system according to a fourth modification of the present embodiment.
Figure 25B:
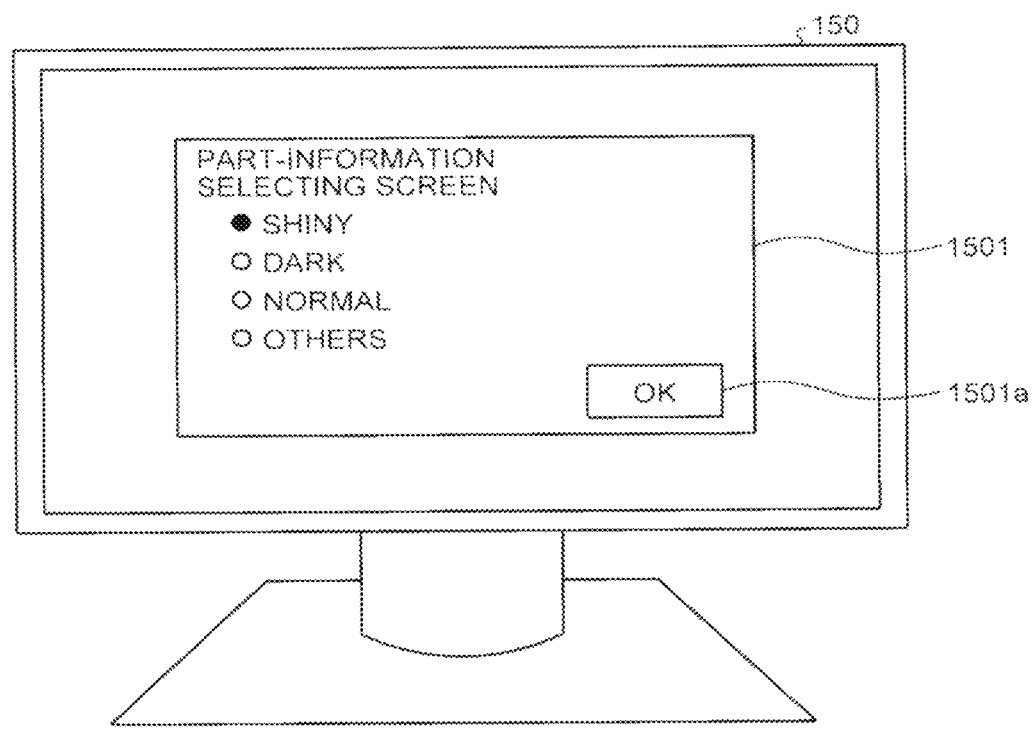
Figure 26:
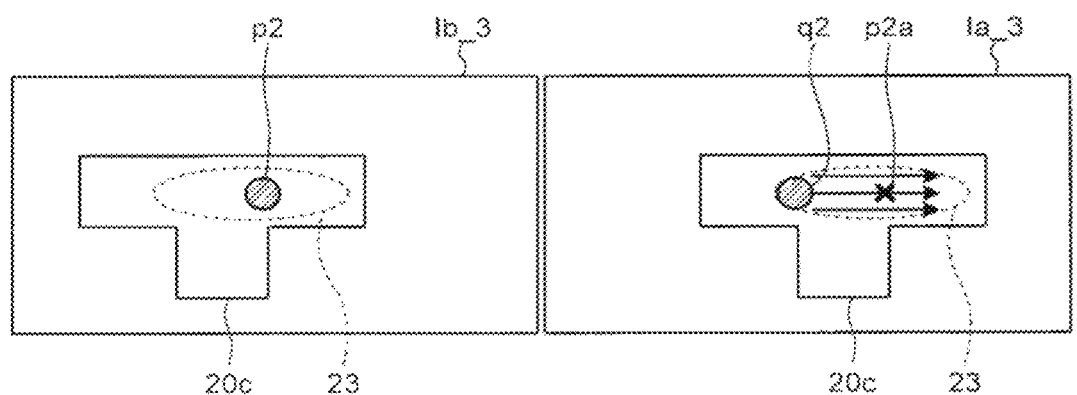
FIG. 26 is an explanatory diagram for a case of calculating a corresponding pixel in a comparison image that corresponds to a reference pixel in a reference image in the parallax-value deriving system according to the fourth modification of the present embodiment.

FIGS. 25A and 25B are diagrams illustrating one example of a part-information selecting screen in a parallax-value deriving system according to a fourth modification of the present embodiment. FIG. 26 is an explanatory diagram for a case of calculating a corresponding pixel in a comparison image that corresponds to a reference pixel in a reference image in the parallax-value deriving system according to the fourth modification of the present embodiment. With Reference to FIGS. 25A, 25B, and 26, operation of the parallax-value deriving system according to the present modification is explained mainly about a point different from the parallax-value deriving system 15 of the embodiment described above and the parallax-value deriving system of the third modification described above.

In the parallax-value deriving system according to the present modification, a regular information processing device such as a personal computer (PC) is connected to the imaging-unit control I/F 107 of the stereo camera 2. As described above, because the dimming control unit 9 is connected to the imaging-unit control I/F 107, when connecting an information processing device, for example, the dimming control unit 9 and the information processing device may be connected through a network equipment such as a switching hub. The information processing device includes an input device such as a mouse and a keyboard, a display device that displays setting screens and the like (for example, a display device 150 shown in FIG. 25), an external storage device, such as a CPU, a RAM, a ROM, and a hard disk drive (HDD), and the like.

FIG. 25A is a diagram illustrating a state in which a part-information selecting screen 1500 to select a material of a part to be a subject (information about the subject) is displayed on the display device 150. A part on which the pattern light is irradiated from the pattern emitting unit 8 differs in an area of a region to be in a saturated state according to the material of the part (for example, metal, acryl, wood, glass, and the like). For example, when the material of the part is metal, it has been known that metal is prone to reflect light and a saturated state is likely to occur in advance, the part that is metal on which the pattern light is irradiated from the pattern emitting unit 8 has a tendency to have a large area of saturated region compared to other materials. In this case, by selecting "metal" by the input device with a radio button or the like in the part-information selecting screen 1500, and by selecting an OK button 1500a, the searching range to calculate the cost value C can be set to a range suitable for metal. On the other hand, when the material of the part is wood, it has been known that wood is less prone to reflect light and a saturated state is not likely to occur in advance, the part that is wood on which the pattern light is irradiated from the pattern emitting unit 8 has a tendency to have a small area of saturated region compared to other materials.

FIG. 25B is a diagram illustrating a state in which a part-information selecting screen 1501 to select a reflection level of a part to be a subject (information about the subject) is displayed on the display device 150. A part on which the pattern light is irradiated from the pattern emitting unit 8 differs in an area of a region to be in a saturated state according to the reflection level of the part (for example, shiny, dark, normal, and the like). For example, when a surface of the part is in a shiny state and has a high reflection level, because it has been known that the part in the shiny state is prone to reflect light and a saturated state is likely to occur in advance, the part on which the pattern light is irradiated form the pattern emitting unit 8 has a tendency to have a large area of saturated region compared to parts with other reflection levels. In this case, by selecting "shiny" by the input device with a radio button or the like in the part-information selecting screen 1501, and by selecting an OK button 1501a, the searching range to calculate the cost value C can be set to a range suitable for "shiny". On the other hand, when the surface of the part is in a dark state without a shine, because it has been known that a surface of a part in a dark state without a shine is less prone to reflect light and a saturated state is not likely to occur in advance, the part without a shine on which the pattern light is irradiated from the pattern emitting unit 8 has a tendency to have a small area of saturated region compared to parts with other reflection levels. The part-information selecting screens 1500 and 1501 displayed on the display device 150 described above and the input device operated by a user correspond to a "setting unit" of the present invention.

For example, it is assumed that the part is of metal or of one having a shiny state, and that "metal" or "shiny" is set on the part-information selecting screen 1500 or the part-information selecting screen 1501 of the display device 150. Suppose that a saturated region 23 is formed in a part region 20c that is a portion in which a part is imaged in a comparison image Ia_3 (or reference image Ib_3) due to reflection of the part as shown in FIG. 26. The cost calculating unit 53 changes the size of the reference region p2 in the saturated region 23 of the reference image Ib_3 to a size according to the material or the reflection level of the part.

In this example, because the part is set to metal or one in a shiny state, the size of the reference region p2 is increased to a size larger than the size corresponding to other materials or other reflection levels of the part. When search to calculate the cost value C from the candidate region q2 (in the same size as the reference region p2) of the saturated region 23 in the comparison image Ia_3 with respect to the reference region p2 of the saturated region 23 in the reference image Ib_3 is performed (in a direction of arrow in FIG. 26), because any of pixel values in the candidate region is in a saturated state, a parallax value of a corresponding region (corresponding region p2a in FIG. 26) that corresponds to the reference region p2 cannot be derived. Therefore, the cost calculating unit 53 (see FIG. 11) determines a predetermined range as for a searching range to calculate the cost value C, and when pixel values are successively equal to or higher than a predetermined value enabling to regard as a saturated state in the predetermined region and more, it is determined that a saturated state occurs in the predetermined range. Subsequently, the cost calculating unit 53 transmits a result of determination to the dimming control unit 9, and the analyzing unit 200 of the dimming control unit 9 analyzes that there is a region in a saturated state in the brightness image (comparison image Ia_3 (or reference image Ib_3)). When determined that there is an image abnormality in the brightness image by the analyzing unit 200, the dimming control unit 9 performs dimming control for the pattern light to be irradiated to the part by the pattern emitting unit 8.

Thus, by setting the size of the reference region p2 of the reference image Ib_3 (and the candidate region q2 in the comparison image Ia_3) according to a material or a reflection level of a part, the accuracy in determining a presence of a region in a saturated state of a part can be improved.

Fifth Modification

Figure 27:
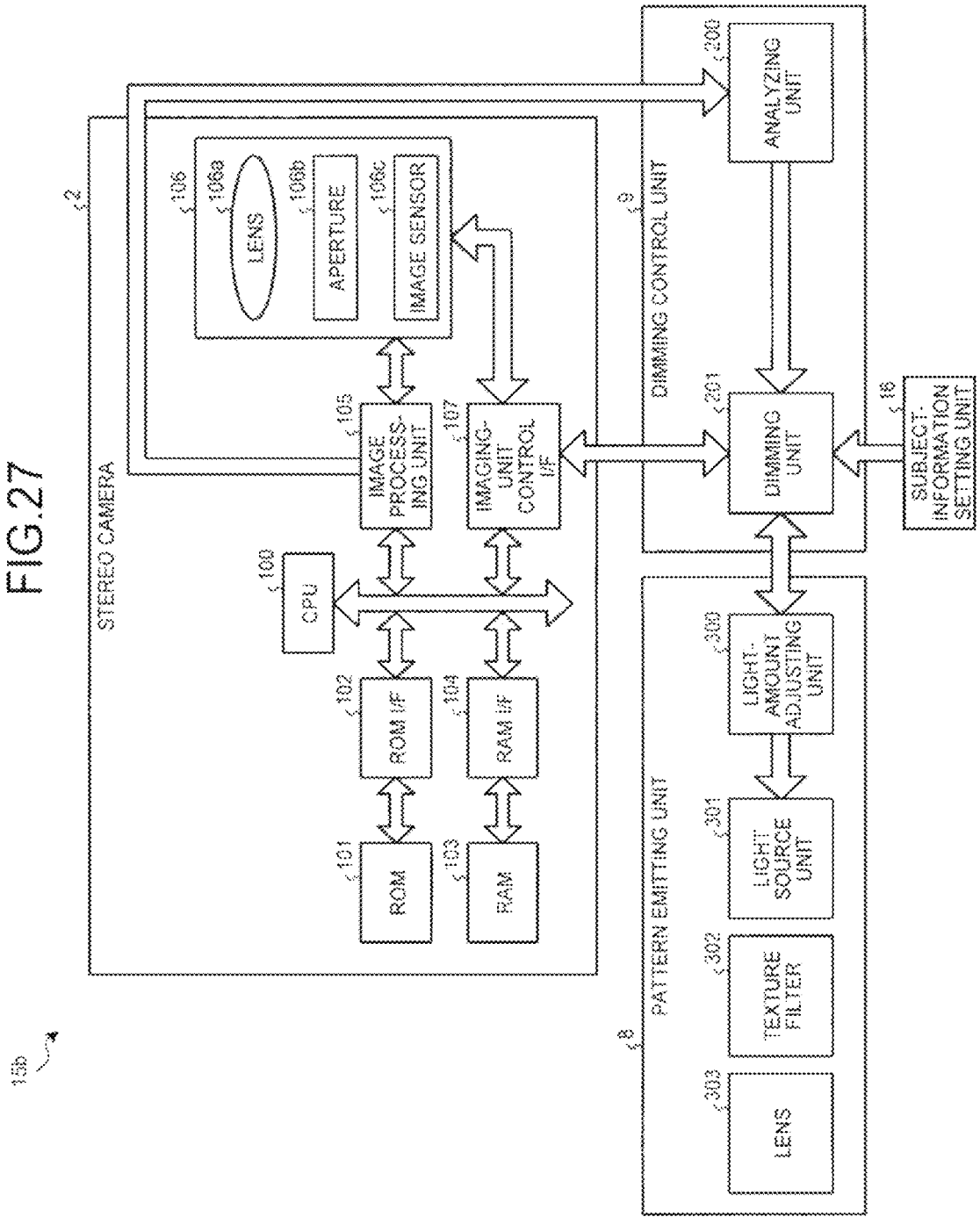
FIG. 27 is a diagram illustrating one example of a hardware configuration of a parallax-value deriving system according to a fifth modification of the present embodiment.

FIG. 27 depicts one example of a hardware configuration of a parallax-value deriving system according to a fifth modification of the present embodiment. With Reference to FIG. 27, a parallax-value deriving system 15b according to the present modification is explained mainly about a point different from the parallax-value deriving system 15 of the embodiment described above. When being the same as the functions of the respective components of the parallax-value deriving system 15 of the embodiment described above, the same reference symbols are given in FIG. 27, and explanations thereof are omitted herein.

As shown in FIG. 27, the parallax-value deriving system 15b according to the present modification includes the stereo camera 2, the pattern emitting unit 8, the dimming control unit 9, and a subject-information setting unit 16 (setting unit).

The subject-information setting unit 16 is a device that sets a material or a reflection level of a part, which is information about a subject. The subject-information setting unit 16 transmits set information about a subject to the dimming unit 201 of the dimming control unit 9. The subject-information setting unit 16 may be configured to include the part-information selecting screens 1500 and 1501 displayed on the display device 150 explained in the fourth modification described above, and an input device that is operated by a user.

The dimming unit 201 is a circuit that receives the information about the subject from the subject-information setting unit 16, and a result of analysis from the analyzing unit 200, and transmits an adjustment amount according to the subject information or the result of analysis to the pattern emitting unit 8. Specifically, because it can be predicted in advance a tendency in a change in area of a region to be in a saturated state or in a state having blocked-out shadows in accordance with the information of the subject received from the subject-information setting unit 16, the dimming unit 201 adjusts a light amount of the pattern light irradiated from the pattern emitting unit 8, so as to reduce the saturated state or the state having blocked-out shadows. For example, when the subject-information setting unit 16 sets "metal" as the material of a part, and "shiny" as the reflection level of the part, the dimming unit 201 compares with cases of other materials or reflection levels, and reduces a light amount of the pattern light irradiated from the pattern emitting unit 8.

Thus, in the embodiment, it is set in advance a material or a reflection level of a part, which is information about a subject, and based on the setting, a light amount of the pattern light irradiated by the pattern emitting unit 8 is adjusted. Accordingly, occurrence of a saturated state or a state having blocked-out shadows can be suppressed. Therefore, the accuracy in identifying a subject can be improved.

Although it has been explained that the dimming unit 201 receives a result of analysis from the analyzing unit 200 and transmits an adjustment amount according to the result of analysis to the pattern emitting unit 8 as described above, it is not limited thereto. The dimming unit 201 is not required to use a result of analysis of the analyzing unit 200.

Figure 28:
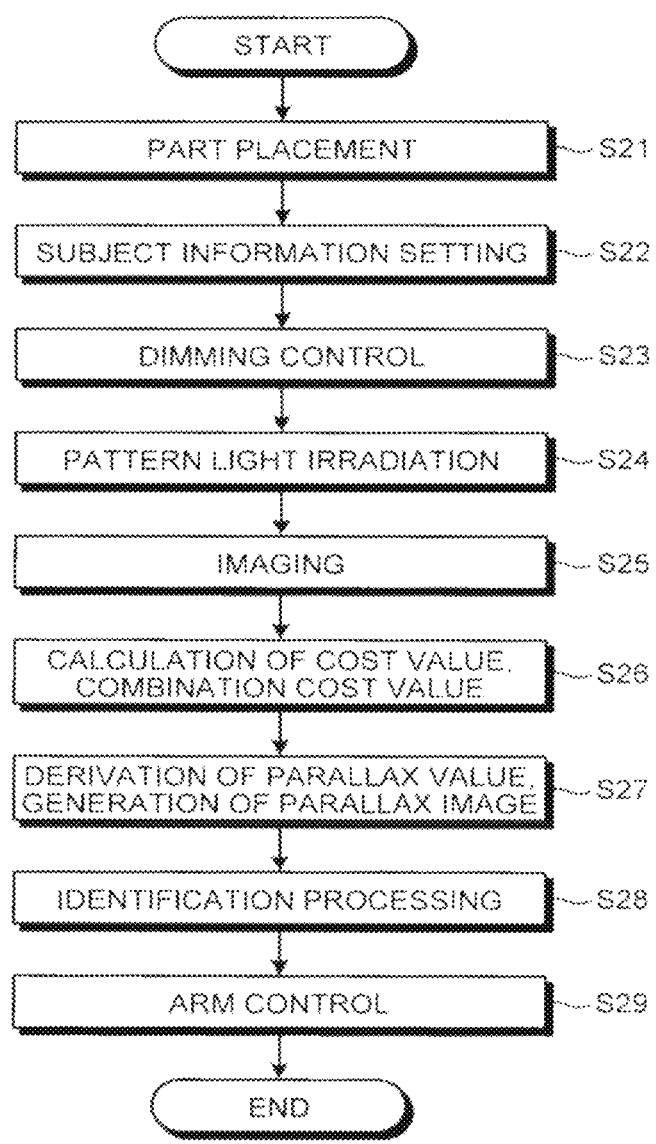
FIG. 28 is a flowchart of one example of operation of a conveying system of the fifth modification of the present embodiment.

FIG. 28 is a flowchart indicating one example of operation of a conveying system of the fifth modification of the present embodiment. With reference to FIG. 28 a point different from the overall operation of the conveying system 1 shown in FIG. 17 described above is mainly explained.

Step S21

Similarly to FIG. 1 of the embodiment described above, it is assumed that the part 20 is placed on the background portion 21, which is the stage. It may be assumed that the part 20 is placed on the background portion 21 from equipment in a previous process in the conveying system 1, or may be assumed that the part 20 is placed on the background portion 21 by an operator. The operation proceeds to step S22.

Step S22

The subject-information setting unit 16 sets a material or a reflection level of the part, which is information about a subject, and transmits set information about the subject to the dimming unit 201 of the dimming control unit 9. The operation proceeds to step S23.

Step S23

The dimming unit 201 adjusts an amount of light of the pattern light irradiated from the pattern emitting unit 8 in accordance with the information about the subject received from the subject-information setting unit 16. The operation proceeds to step S24.

Steps S24 to S29

Processes at steps S24 to S29 of the present modification are the same as the processes at steps S12 to S15, S18, and S19 indicated in FIG. 17, respectively.

Although it has been explained that a stereo camera is equipped in the embodiment described above (including respective modifications), it is not limited thereto, but a monocular camera may be equipped in place of the stereo camera. In this case, a distance may be measured by moving the monocular camera to image a part as a subject for several times, and by using the obtained images, or by applying the phase shift method.

Furthermore, when at least either one of the cost calculating unit 53, the combination-cost calculating unit 61, the sub-pixel estimating unit 62, and the generating unit 63 is implemented by executing a computer program, the program is provided in a state being installed in an ROM, and the like. Moreover, a program that is executed by the stereo cameras 2, 2a described above may be configured to be provided by storing in a computer-readable recording medium, such as a CD-ROM, a flexible disk (FD), a CD-recordable (CD-R), and a digital versatile disk (DVD), with a file in an installable format or in an executable format. Furthermore, it may be configured such that a program that is executed by the stereo camera 2, 2a of the above embodiment is stored in a computer that is connected to a network such as the Internet, and is provided by being downloaded through the network. Moreover, the program executed by the stereo camera 2, 2a has a modular structure including at least either one of the cost calculating unit 53, the combination-cost calculating unit 61, the sub-pixel estimating unit 62, and the generating unit 63, and as actual hardware, by reading and executing the program by the CPU 100 from the ROM 101, the respective components described above are loaded on a main storage device to be generated.

According to the embodiments of the present invention, it is possible to derive a parallax value with high accuracy.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system, comprising:
    a light emitting unit that irradiates pattern light having a specific pattern to a subject to form a texture on the subject;
    an imaging unit that captures the subject on which the texture is formed;
    a deriving unit that derives distance information to the subject based on an image captured by the imaging unit;
    an analyzing unit that analyzes whether or not an image abnormality is present in either one of the captured image and an image based on the distance information; and
    a dimming unit that performs dimming control when the analyzing unit analyzes that the image abnormality is present.

2. The information processing system according to claim 1, wherein
    the imaging unit includes a first imaging unit that captures the subject to generate a reference image, and a second imaging unit that is arranged at a position different from a position where the first imaging unit is arranged, and that captures the subject to generate a comparison image,
    the deriving unit includes a calculating unit that calculates a matching degree between a region in the reference image and a region in the comparison image,
    the deriving unit derives, as the distance information, a parallax value that identifies a region in the comparison image corresponding to a reference region in the reference image, based on the matching degree calculated by the calculating unit, and
    the information processing system further comprises a generating unit that generates a parallax image based on the parallax value, wherein
    the analyzing unit analyzes whether or not the image abnormality is present in the captured image and in the parallax image.

3. The image processing system according to claim 2, wherein
    the dimming unit performs, as the dimming control, operation of exposure adjustment of the first imaging unit and the second imaging unit, when the analyzing unit analyzes that the texture is blurry in the captured image as the image abnormality, or that the dimming unit has reached a dimming limit.

4. The information processing system according to claim 3 further comprising
    a setting unit that sets information about the subject, wherein
        the calculating unit changes a size of the reference region in the reference image in accordance with the information about the subject.

5. The information processing system according to claim 3, wherein
    the dimming unit performs, as the exposure adjustment operation, processing of dynamic range expansion on the reference image and the comparison image.

6. The information processing system according to claim 3 wherein
    the analyzing unit analyzes that the image abnormality is present in the capture image, when a brightness value of the captured image is equal to or larger than a first value in a predetermined range or more, or equal to or lower than a second value that is smaller than the first value in the predetermined range or more of the captured image.

7. The information processing system according to claim 4 wherein
    the analyzing unit analyzes that the image abnormality is present in the capture image, when a brightness value of the captured image is equal to or larger than a first value in a predetermined range or more, or equal to or lower than a second value that is smaller than the first value in the predetermined range or more of the captured image.

8. The information processing system according to claim 5 further comprising
    a setting unit that sets information about the subject, wherein
        the calculating unit changes a size of the reference region in the reference image in accordance with the information about the subject.

9. The information processing system according to claim 7 further comprising
    a setting unit that sets information about the subject, wherein
        the calculating unit changes a size of the reference region in the reference image in accordance with the information about the subject.

10. The image processing system according to claim 2, wherein
    the analyzing unit analyzes that the image abnormality is present in the capture image, when a brightness value of the captured image is equal to or larger than a first value in a predetermined range or more, or equal to or lower than a second value that is smaller than the first value in the predetermined range or more of the captured image.

11. The image processing system according to claim 2, further comprising
    a setting unit that sets information about the subject, wherein the calculating unit changes a size of the reference region in the reference image in accordance with the information about the subject.

12. The information processing unit according to claim 11, wherein
the information about the subject is a reflection level of the subject.

13. The information processing system according to claim 12, wherein
the dimming unit adjusts a light amount of the pattern light of the light emitting unit, in accordance with the information about the subject set by the setting unit.

14. The information processing system according to claim 11, wherein the information about the subject is a material of the subject.

15. The information processing system according to claim 14, wherein
the dimming unit adjusts a light amount of the pattern light of the light emitting unit, in accordance with the information about the subject set by the setting unit.

16. The information processing system according to claim 11, wherein
the dimming unit adjusts a light amount of the pattern light of the light emitting unit, in accordance with the information about the subject set by the setting unit.

17. An information processing system comprising:
a light emitting unit that irradiates a pattern light having a specific pattern to a subject to form a texture on the subject;
an imaging unit that captures the subject on which the texture is formed;
a deriving unit that derives distance information to the subject based on an image captured by the imaging unit;
a setting unit that sets information about the subject; and
a dimming unit that performs dimming control based on the information about the subject set by the setting unit.

18. The information processing system according to claim 17, wherein
the information about the subject is a reflection level of the subject.

19. The information processing system according to claim 17, wherein the information about the subject is a material of the subject.

20. An information processing method, comprising
irradiating pattern light having a specific pattern to a subject to form a texture on the subject;
capturing the subject on which the texture is formed;
deriving distance information to the subject based on the captured image;
analyzing whether or not an image abnormality is present in either one of the captured image and an image based on the distance information; and
performing dimming control when analyzed that the image abnormality is present.

* * * * *